United States Patent
Pettit et al.

[11] Patent Number: 6,036,284
[45] Date of Patent: Mar. 14, 2000

[54] MODULAR LOCOMOTIVE BRAKE CONTROL UNIT

[75] Inventors: D. Mark Pettit, LaFargeville; John J. Allen, Watertown; Ronald O. Newton, Adams, all of N.Y.; Brett A. Pierce, Arden, N.C.; Kevin D. Root, Black River, N.Y.; Richard E. Sinn, Watertown, N.Y.; Eric C. Wright, Evans Mills, N.Y.

[73] Assignee: New York Air Brake Corporation, Watertown, N.Y.

[21] Appl. No.: 08/927,634

[22] Filed: Sep. 11, 1997

Related U.S. Application Data

[60] Provisional application No. 60/026,039, Sep. 13, 1996.

[51] Int. Cl.$^7$ ........................................................ B60T 7/00
[52] U.S. Cl. .............................................. 303/15; 303/20
[58] Field of Search ...................................... 303/3, 15, 20

[56] References Cited

U.S. PATENT DOCUMENTS

| | | | |
|---|---|---|---|
| 5,064,251 | 11/1991 | Romansky | 303/3 |
| 5,172,316 | 12/1992 | Root et al. | 303/3 |
| 5,249,125 | 9/1993 | Root et al. | 303/3 |
| 5,369,587 | 11/1994 | Root et al. | 303/3 |
| 5,412,572 | 5/1995 | Root et al. | 303/3 |
| 5,590,042 | 12/1996 | Allen, Jr. et al. | 303/3 |
| 5,676,431 | 10/1997 | McLaughlin et al. | 303/15 |

*Primary Examiner*—Robert J. Oberleitner
*Assistant Examiner*—Robert A. Siconolfi
*Attorney, Agent, or Firm*—Barnes & Thornburg

[57] ABSTRACT

A modular locomotive brake control unit having a manifold with electropneumatic modules each including electropneumatic and pneumatic elements removably mounted thereon each as a unit from the manifold. An electropneumatic equalization reservoir module controls the pressure at the equalization port. A brake pipe module controls brake pipe port pressure in response to the equalization reservoir port. An electropneumatic independent brake module controls pressure at the independent brake port as a locomotive brake signal. An electropneumatic brake signal module provides a pneumatic train brake signal. A controller controls the electropneumatic modules. Each electropneumatic unit includes an electropneumatic supply valve and an electropneumatic exhaust valve and preferably an electropneumatic valve having a first input connected to the supply and exhaust valves. The electropneumatic modules includes a common block having a first interface with the manifold and including the electropneumatic valve as to supply and exhaust valves and includes an auxiliary block mounted to the common block having module specific pneumatic and electrical elements mounted on the auxiliary block.

39 Claims, 23 Drawing Sheets

MODULAR LOCOMOTIVE BRAKE CONTROL UNIT

CROSS-REFERENCE

This application claims the benefit of U.S. Provisional Application No. 60/026039 filed Sep. 13, 1996 titled Locomotive Brake Control Unit with respect to common subject matter and is incorporated herein by reference.

BACKGROUND AND SUMMARY OF THE INVENTION

The present invention relates generally to computer controlled railroad locomotive brake equipment and more specifically to a system redesign.

The availability of computer controlled railroad brake equipment includes the CCB equipment available from New York Air Brake Corporation. The CCB locomotive brake control equipment is described in U.S. Pat. No. 5,172,316 and is illustrated in FIG. 1 and 2. The numbers used throughout this application correspond to that used in this patent for sake of clarity and consistency. With computerized and electric control, the operation of the locomotive and the train must be safe for failure of any electrically controlled portion.

With the addition of electropneumatic braking and other electric subsections, there has been a proliferation of new onboard locomotive subsystems. This has resulted in a squeeze of real estate available in the locomotive. Since the interconnection of these various subsystems have been added one by one, it has increased the complexity of their interconnection and their weight. For example, the complexity of the brake control portion or pneumatic control unit 62 of the CCB is illustrated in FIG. 3. The manifold is complex and wiring must be connected to each of the individual electrical valves and transducers. There are thirty-four line replaceable units mounted to this manifold. Since the locomotive cannot carry thirty-four of the individual components, the whole locomotive must be taken into a shop for repair.

The complete brake control portion 62 can be removed and a new one inserted. This takes a substantial amount of time because of the number of wires and interconnections for the electrical components. The brake control portion 62 would then have to be tested and the individual parts replaced. Also, the brake control portion 62 is not adaptable to adding new functions nor to removing existing functions as the design requirements change in future locomotives.

With respect to real estate occupied by the CCB, it is 28,000 cubic inches. Another available locomotive brake control system known as EPIC from Westinghouse Air Brake Corporation has a volume of 14,000 cubic inches. With increased sophistication within the locomotive, there is also a need for locomotive system integration to allow communication and control between the various systems and subsystems.

The control unit of the present invention is a modular locomotive brake control unit having a manifold with electropneumatic modules each including electropneumatic and pneumatic elements removably mounted thereon each as a unit from the manifold. An electropneumatic equalization reservoir module controls the pressure at the equalization port. A brake pipe module controls brake pipe port pressure in response to the equalization reservoir port. An electropneumatic independent brake module controls pressure at the independent brake port as a locomotive brake signal. An electropneumatic brake signal module provides a pneumatic train brake signal. A controller controls the electropneumatic modules.

Each electropneumatic unit includes an electropneumatic supply valve and an electropneumatic exhaust valve and preferably an electropneumatic valve having a first input connected to the supply and exhaust valves. The electropneumatic modules includes a common block having a first interface with the manifold and including the electropneumatic valve and the supply and exhaust valves and includes an auxiliary block mounted to the common block having module specific pneumatic and electrical elements mounted on the auxiliary block.

The auxiliary block includes at least one transducer and one test port. An electropneumatic actuated module is also removably mounted to the manifold to control an actuate port.

The brake pipe module includes a pneumatic relay response to the equalization reservoir to control the brake pipe port includes a pneumatic emergency vent valve responsive to brake pipe pressure for venting the brake pipe. The brake pipe module also includes an electropneumatic cut-off valve between the relay and the brake pipe port. The brake pipe module also includes a first and second electropneumatic valves for venting the brake port in response to electrical signals from an operator controller and the system controller.

The brake cylinder module includes a pneumatic relay responsive to the higher of the train brake or locomotive brake signals provided to a selected valve. An electropneumatic resetting dynamic brake interlock is connected between the brake signal and input of the selector valve. A pneumatic dead-in-tow module is also mounted to the manifold and includes a pneumatic valve responsive to the brake pipe port to provide a backup pneumatic train brake signal. A pneumatic bailoff valve on the dead-in-tow module is responsive to an actuating port to selectively connect the backup train signal or an exhaust to the brake cylinder module. An electric non-resetting dynamic brake interlock in the dead-in-tow module is connected in the control input of the bailoff valve.

An equalization reservoir module includes an electropneumatic valve for selectively connecting a supply port or the output of its supply and exhaust valve to the equalization reservoir port.

The independent brake module includes an electropneumatic valve for connecting its supply and exhaust valve as the control input to its relay valve which controls the independent brake port.

A power supply for the controller is mounted on the manifold, which acts as a heat sink. Each of the electropneumatic modules include an identifier at the controller and stores the identifier of each module mounted on the manifold.

Other objects, advantages and novel features of the present invention will become apparent from the following detailed description of the invention when considered in conjunction with the accompanying drawings.

BRIEF DESCRIPTION OF THE DRAWINGS

FIG. 15 is a block diagram of the triple valve control portion according to the principles of the present invention.

DETAILED DESCRIPTION OF THE DRAWINGS

Figure 1:
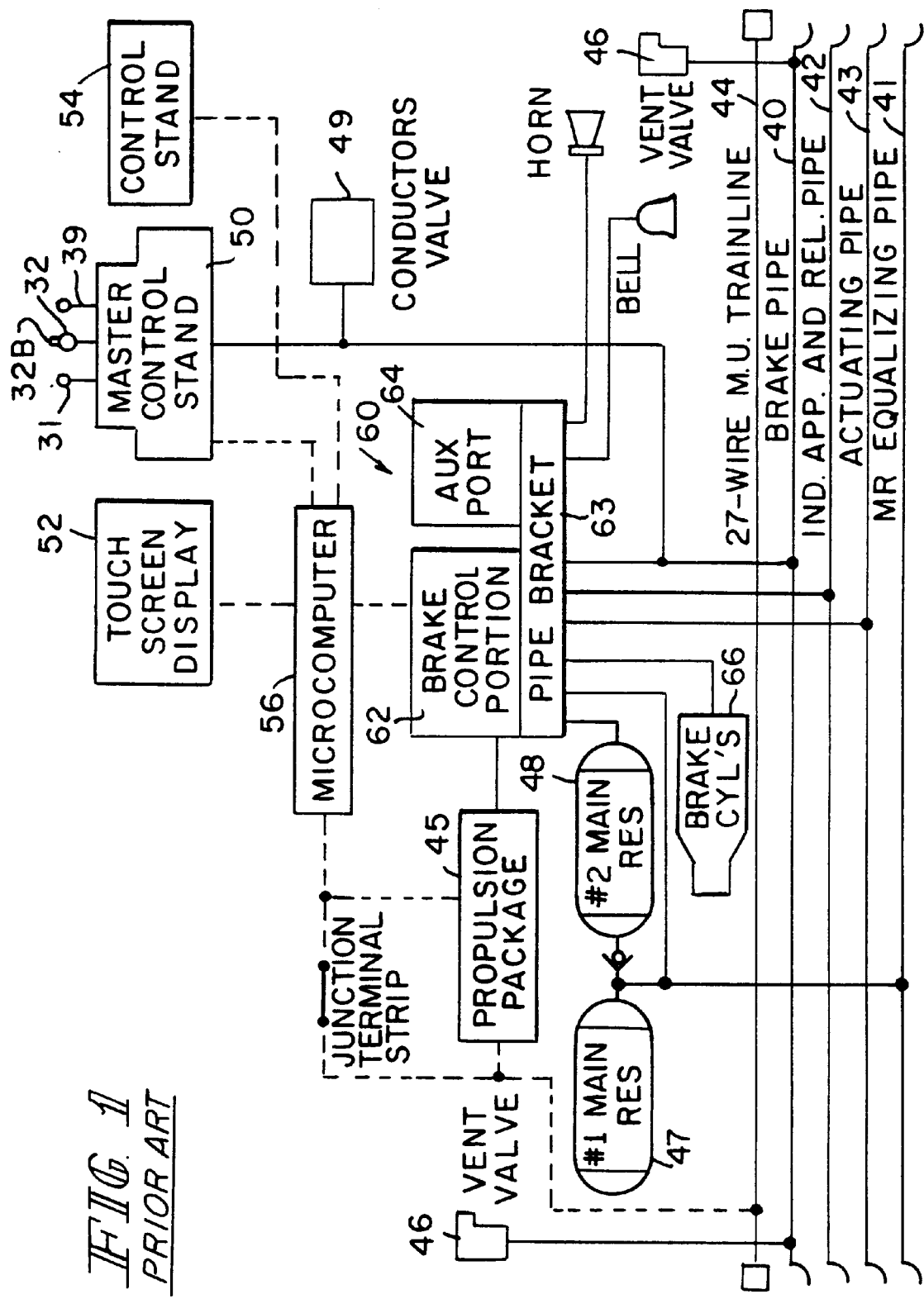
FIG. 1 is a schematic representation of a locomotive control system of the prior art.

A computerized locomotive control system of the prior art is illustrated in FIG. 1. It should be noted that in the Figures the fluid lines of the pneumatic system will be illustrated by solid (FIGS. 1, 2) or thick (FIGS. 6 and 8–15) lines whereas the electrical interconnections will be illustrated by dash (FIGS. 1, 2) or thin (FIGS. 6 and 8–15) lines. Wherever possible, the elements in the Figures will have the same numbers as those of the prior art described in FIGS. 1 and 2. All modifications will have a reference number in the hundreds. A master control stand 50 includes the automatic brake handle 31, the independent brake handle 32 and the throttle 39. The locomotive includes the brake pipe 40, the main reservoir equalization pipe 41, the independent application and release pipe 42 (#20 pipe), actuating pipe 43 (#13 pipe), and a 27-wire multiple unit electrical trainline 44. The standard pair of vent valves 46 are provided on the brake pipe 42.

The master control stand 50 is fluidly connected to the brake pipe 40 so as to directly apply an emergency condition fluidly to the brake pipe. A conductor valve 49 is also connected to the brake pipe 40 to apply an emergency condition. The master control stand 50 is electrically connected to the microcomputer 56 as are touch screen display 52 and an auxiliary control stand 54. Microcomputer 56 is connected to the propulsion package 45, which is a standard prior art propulsion package, and both are connected to the 27-wire trainline 44 for electrically communicating with the other locomotives on the train.

An electropneumatic interface control valve 60 between the microcomputer 56 and the pneumatic braking system is shown as including the brake control portion 62 and an auxiliary portion 64 both connected to pipe bracket 63. Interface control valve 60 provides all the functions of the control of the brakes, both pneumatically and electrical signaling, and for auxiliary controls. The pipe bracket 63 is a connection of all pipe interfaces which provides a unitized valve for simplification of maintenance. The pipe bracket 63 has the required reservoir for brake operations and contains disposable filters for the pneumatic inputs.

The brake control portions 62 provides for all braking portions found on the locomotive. This controls the brake pipe 40, the brake cylinder 66 of the locomotive, independent brake pipe 42 and actuating pipe 43. It provides all the required electrical interfaces for the operation of the brake system. The auxiliary portion 64 provides pneumatic controls for the special functions. This may be for the sanding, pneumatic horns, bells, etc. Auxiliary portion 64 operates independent of the brake valve.

A first main reservoir 47 is connected to the main reservoir equalization pipe 41 as is a second main reservoir 48. The second main reservoir 48 is connected to the electromagnetic interface control valve 60.

The system of FIG. 1 is a simplification of the controls by consolidating the numerous engineer control devices in a central location. Controls have been consolidated into a three handle master controller unit 50 and a touch screen display 52. All of the normal train operation will be obtainable through these two devices. A fuel pump, engine run, headlights, auxiliary lights and heater controls are not incorporated into the microcomputer 56 since they would not simplify the operation. These functions are in the auxiliary control stand 54. Other than the master control stand 50 and the brake pipe 40 providing an emergency brake application directly to the brake pipe 40, the master control stand 50 is connected to the pneumatic part of the brake system through the microcomputer 56.

The automatic brake handle 31 provides signals to the microcomputer 56 to the level of command brake or special commands. The independent brake handle 32, which provides independent control over the locomotive brake versus the train brake of the automatic brake handle 31, also provides signals to the microcomputer 56 proportional to handles extreme positions. The independent brake handle 32 includes a button 32*b* which actuates a momentary switch. The pressing of button 32*b* is a command to pressurize the actuating pipe 43. Release of the button will vent the actuating pipe 43. This provides the "bail-off" feature of the automatic brake and if the button is continuously depressed, "bailoff" of an emergency brake. Alternatively, the independent brake handle 32 could itself be physically depressed to effectuate this function mechanically and pneumatically. The throttle 39 is a control for the 27-wire trainline 44 for power and dynamic braking.

Figure 2:
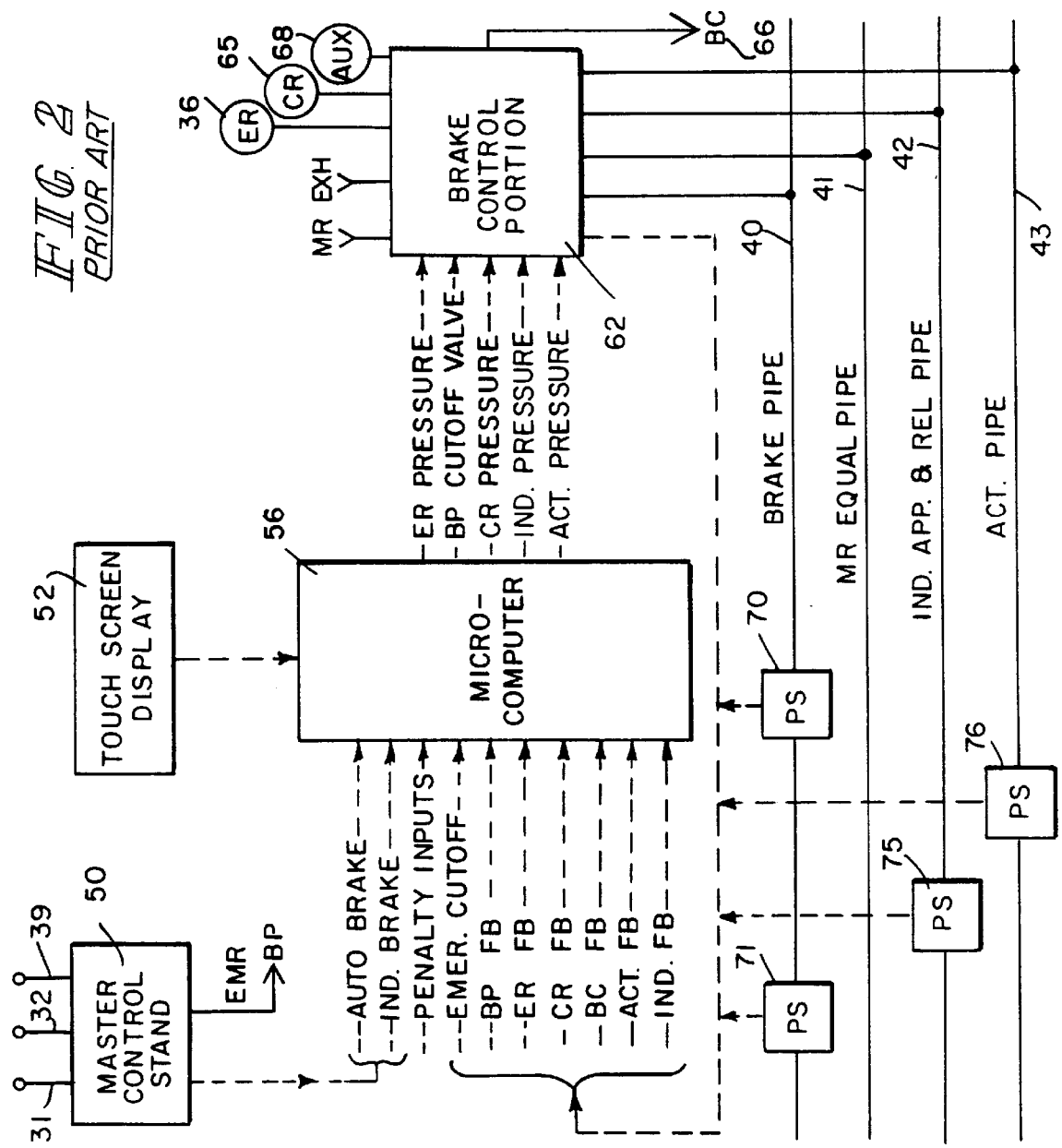
FIG. 2 is a block diagram of a computer controlled railroad locomotive brake equipment of the prior art.

An overview of the brake control portion 62 of the interface control valve 60 will be described with respect to FIG. 2. The brake control portion 62 is connected to main reservoir MR, the main reservoir equalization pipe 41, and exhaust EXH as well as the equalization reservoir 36, the control reservoir 65, and the auxiliary reservoir 68 pneumatically. It also provides a pneumatic output to the brake cylinder BC, 66, the brake pipe 40, the independent application and release pipe 42 and the actuating pipe 43.

Brake control portion 62 receives electrical control signals for the equalization reservoir pressure, brake pipe cutoff valve, the control reservoir pressure, the independent application and release pipe pressure and the actuating pipe pressure from the microcomputer 56. Inputs to the microcomputer 56 includes the automatic brake and independent brake electrical signals from the master control stand 50, penalty inputs from standard penalty devices as electrical signals as well as a group of electrical feedback signals. These feedback signals from pressure sensors in FIGS. 2 and 3 include brake pipe pressure 70, emergency cutoff pressure 71, equalization reservoir pressure 72, control reservoir pressure 74, brake cylinder pressure 73, actuating pipe pressure 76, and independent application and release pipe pressure 75, main reservoir flow 77 and main reservoir pipe pressure 78.

Figure 3:
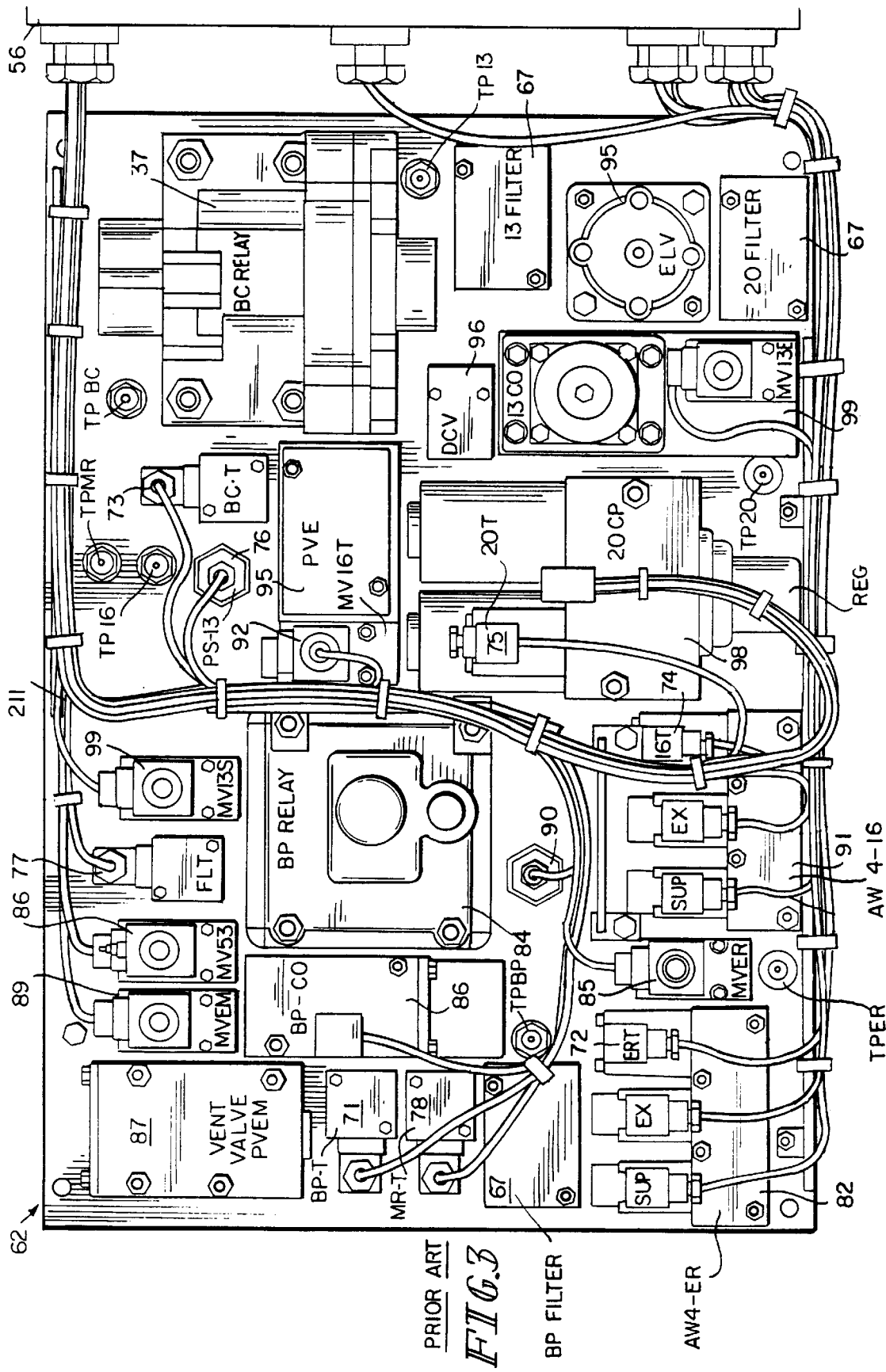
FIG. 3 is a plan view of the brake control portion of the system of FIG. 1 of the prior art CCB.

The elements in the layout of the pneumatic control unit or brake control portion 62 mounted to a manifold or pipe bracket 63 is illustrated in FIG. 3. The numbers used are those in the previous mentioned U.S. Pat. No. 5,172,316. The unit includes brake pipe, 13 pipe and 20 pipe filter 67. Brake pipe transducer 71, brake cylinder transducer 73, main reservoir transducer 78 and reservoir flow transducer 77 are mounted directly to the manifold. A pressure switch PS-BP for an emergency pressure sensor 70 for the brake pipe is also provided on the manifold. The pressure sensing port PS-13 for the 13 pipe pressure switch 76 is also shown directly on the manifold. The equalization reservoir transducer 72, brake signal or 16 port transducer 74 and independent or 20 pipe transducer 75 are mounted to their pressure controllers 82, 91 and 98 respectfully.

The actuator or 13 pipe controller 99 is also mounted to the manifold and includes a 13 cut-off valve 13 CO, a 13 magnetic exhaust valve MV13E and a separately mounted supply magnetic valve MV13S. A magnetic valve MVER 83 connecting the equalization reservoir controller 82 to equalization reservoir is mounted on the manifold directly as are brake pipe relay 84 and brake pipe cut-off 86. The brake pipe cut-off 86 includes a piloted pneumatic section BP-CO and its electropneumatic portion MV53. A piloted vent valve PVEM 87 is mounted to the pipe bracket to vent the brake pipe and is controlled by an electropneumatic valve MVEM 89. The output of the control reservoir pressure control 91 is connected through tow cut-out valve MV16T 92. The emergency valve PVE 95 and double check valve DCV 96 are also mounted on the manifold. The output of the double check valve 96 controls the brake cylinder relay 37 also mounted to the manifold. Test points TP are provided throughout the manifold.

It should be noted that the triple valve 93 response to the brake pipe is not shown since in the CCB it is not mounted on the manifold with the other elements. A review of FIG. 3 indicates that there are a substantial number, for example thirty-four, line removable elements mounted to the manifold. All of the elements related to one particular function are not mounted in a single module, and thus cannot be removed as a single module for replacement, repair or elimination of that function. Similarly, different line removable elements are mounted by different fasteners and nuts and therefore a multitude of tools are needed in order to service the pneumatic control unit.

Figure 4:
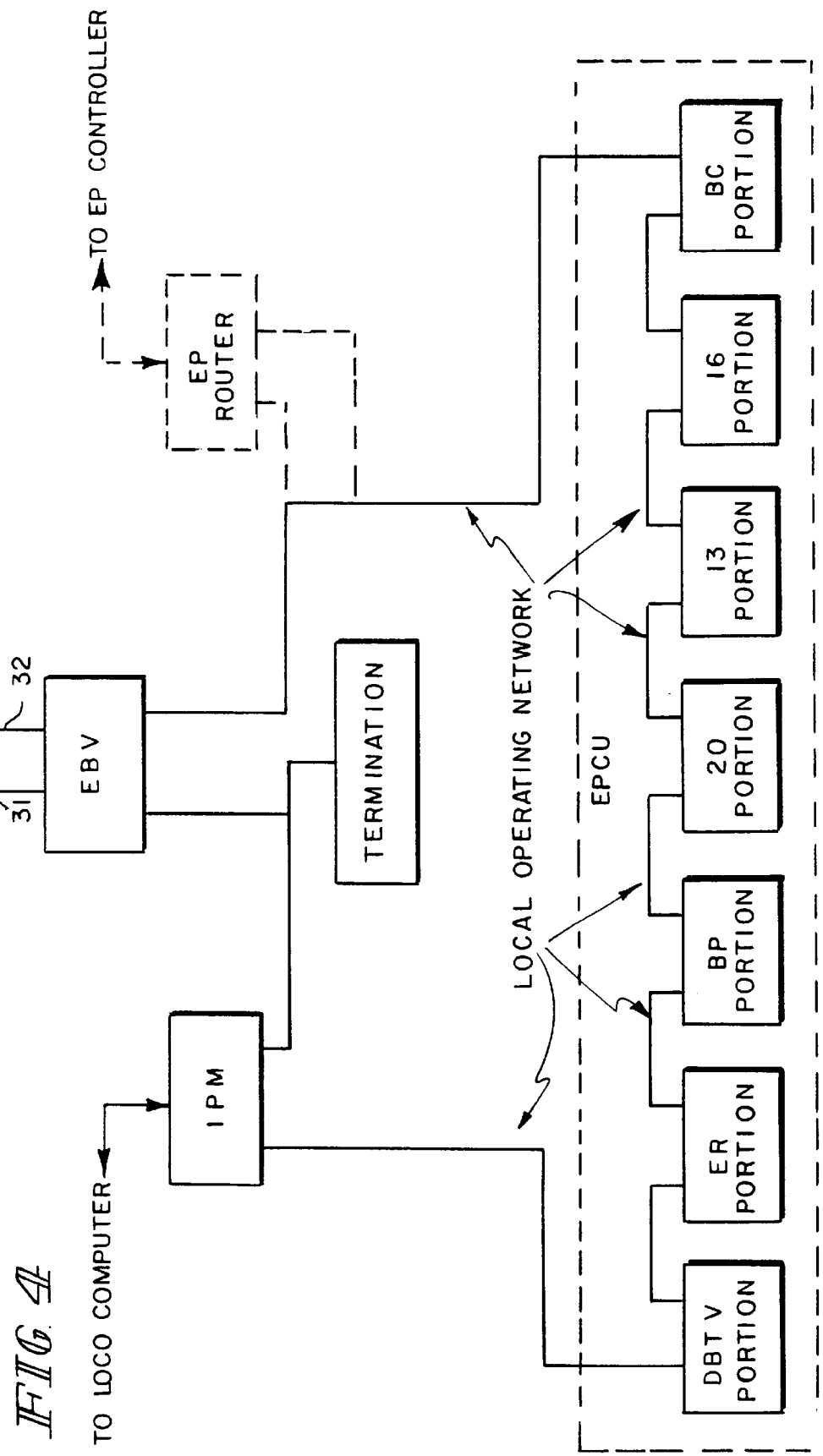
FIG. 4 is a schematic representation of a locomotive control unit according to the principles of the present invention.

An overview of the locomotive brake control unit according to the present invention is illustrated in FIG. 4. The system includes electronic brake valve EBV which serves as the input portion through the human-machine interface. The electronic brake valve EBV includes the automatic brake handle 31 and independent brake handle 32 with a bail-off switch. An easy to read digital display provides instantaneous information on the equalization reservoir target pressure. This avoids the feedback delay inherent in other systems and allows the locomotive engineers to excise precise braking control. As a failsafe feature, the electric brake valve EBV operates a direct acting emergency venting of the brake pipe. It also includes a configurable display.

An integrated processor module IPM is the host computer for distributed power in an electronic air brake system. The IPM manages the electrical interfaces between the brake system, the locomotive and the train. It communicates with integrated locomotive and interfaces electrical trainlines. The IPM can communicate with a portable testing unit for running system diagnostic tests and trouble shooting. It also has the ability to handle and/or include distributed power with the appropriate hardware and software upgrades. The IPM provides high level brake control logic, locomotive system integration communication or interfacing. It should be noted that a preferred distributor system is LOCOTROL Distributed Power Control available from GE-Harris. It includes the display, for example, pressure and remote sessions, set up capability (lead/trail), penalties and diagnostic file log.

An electropneumatic control unit EPCU manages the pneumatic interface between the brake system, the locomotive and the train. It controls the locomotive brake cylinders, brake pipe, independent application and release pipe and the actuating pipe. The electropneumatic control unit includes those portions of the system which relate to the individual pipes. Each of the portions includes electronics and pneumatics which combined into an integral line replaceable units or modules. Each line replaceable unit reflects basic operational entity within the system, can be ready-track replaced in twenty minutes using a single wrench and be light enough to be moved by a single person. The electronics of each of the line replaceable units is potted, is a standard configuration and independent of each other. As can be seen from FIG. 4, the electropneumatic control unit EPCU includes only seven replaceable units as compared to the thirty-four of FIG. 3 of the prior art.

By providing modular portions in the EPCU, improves serviceability and decreases down time of the locomotive. It also allows upgrading a specific portion of the electropneumatic brake control by replacing all portions of that function simultaneously. It also allows elimination of a particular portion as the need and later designs of locomotive and train systems are changed. It also allows substantially easier redesign for customer demands as well as upgrades the future designs. Similarly, by providing the line replaceable units with all the pneumatic electronic and electropneumatic elements on the same block, simplifies the design of the manifold since the interconnection of the elements on the modules are in the line replaceable units.

The different portions of the locomotive control unit are interconnected by an Echelon LonWorks Network. This not only interconnects the modules of the EPCU, but also connects the EPCU to the IPM, EBV and the EP router. The system also has the capability of communicating with electropneumatic controls to each of the individual cars through the EP router. Since the American Association of Railroads, AAR, has selected a standard for electropneumatic car brakes incorporating the Echelon LonWorks communication protocol, ease of communication is reduced. This reduces the number of protocols throughout the train system. The intercommunication of the line replaceable units also allows communication between the line replaceable units or modules and allows a backup or redundancy of one unit for another.

The individual line replaceable units of the EPCU include Neuron chips or microcomputers which contain self-diagnostic capabilities. Diagnostics from each line replaceable unit can be downloaded for quick, efficient troubleshooting. The modular design allows for ready-track replacement of the LRU's eliminating the need to pull the locomotive out of service. This capability simplifies the maintenance task and offers potential to operate the fleet using a "maintenance-on-condition" strategy. By grouping along natural boundaries and using network nodes, it facilitates the software development. Each network node component combines hardware-software "object" with an inherently clean interface.

The ultimate design of the locomotive brake central unit or system of the present invention occupies only 13,670 cubic inches. This is substantially smaller than the prior art previously discussed as occupying 14,000 and 28,000 cubic inches.

Figure 5:
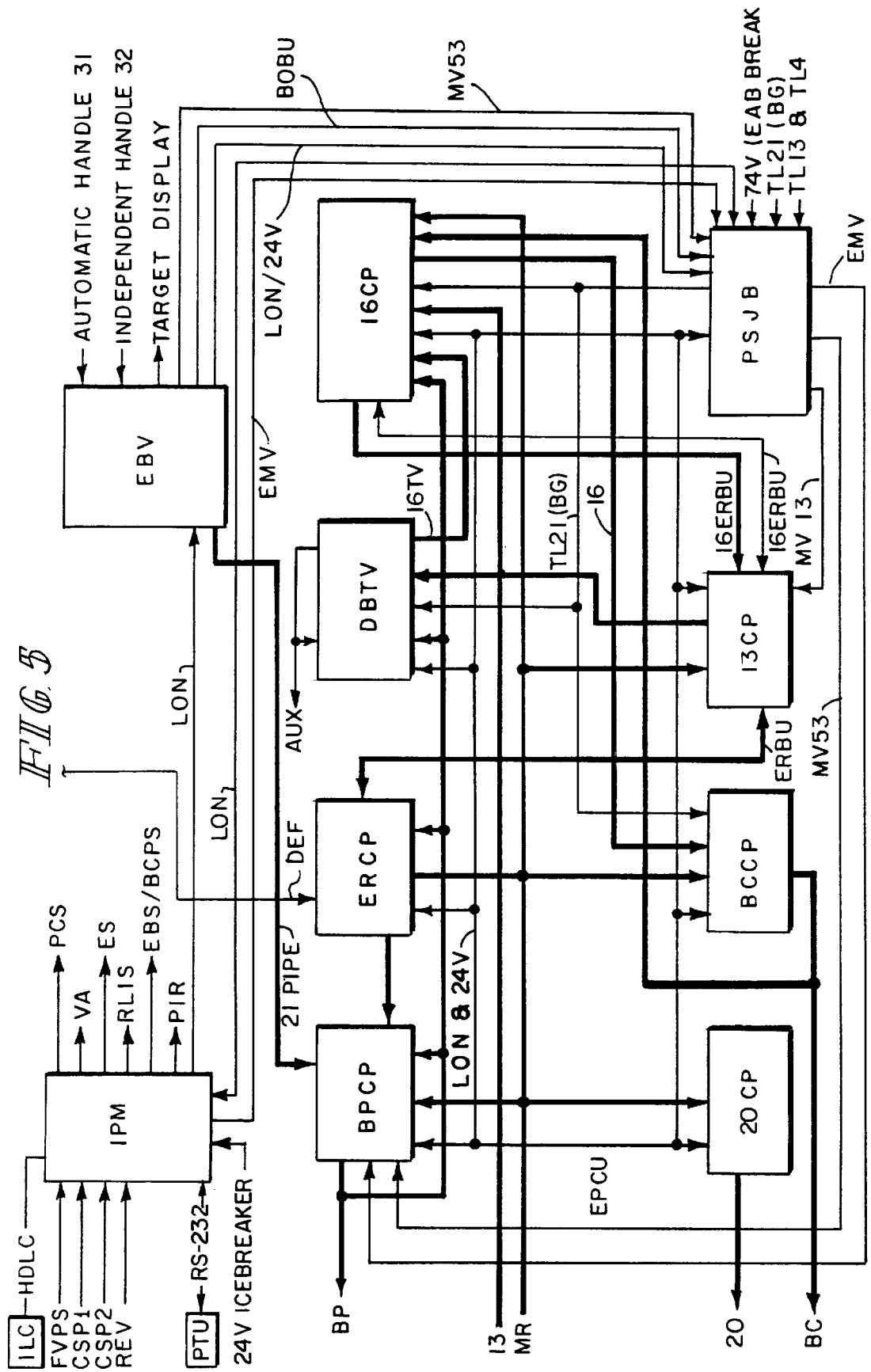
FIG. 5 is a block diagram of the locomotive control unit of FIG. 4.

A more detailed illustration of the electrical, mechanical and pneumatic interconnection of the elements of the system are illustrated in FIG. 5. The integrated processor module IPM is shown connected to an integrated locomotive computer ILC, and to a portable test unit PTU by an RS 232 connection. The other inputs to the IPM are from the propulsion and dynamic braking controller. The electric brake valve EBV receives inputs from the automatic and the independent brake handles and provides as output to the EPCU an output a bailoff signal BOBU and an automatic emergency signal MV53.

The electropneumatic control unit EPCU includes the brake pipe control module BPCP, an equalization reservoir control portion ERCP, a dead-in-tow triple valve DBTV, a brake signal or 16 pipe control portion 16CP, an independent or 20 pipe portion 20CP, a brake cylinder control portion BCCP, an actuating pipe or 13 pipe control portion 13CP and a power supply junction box PSJB. Each of these modules are line replaceable units with the electrical interconnection being in the narrow lines and the pneumatic interconnection being in the thicker lines. A communication loop is LonWorks and includes a 24 volt power line.

Figure 6:
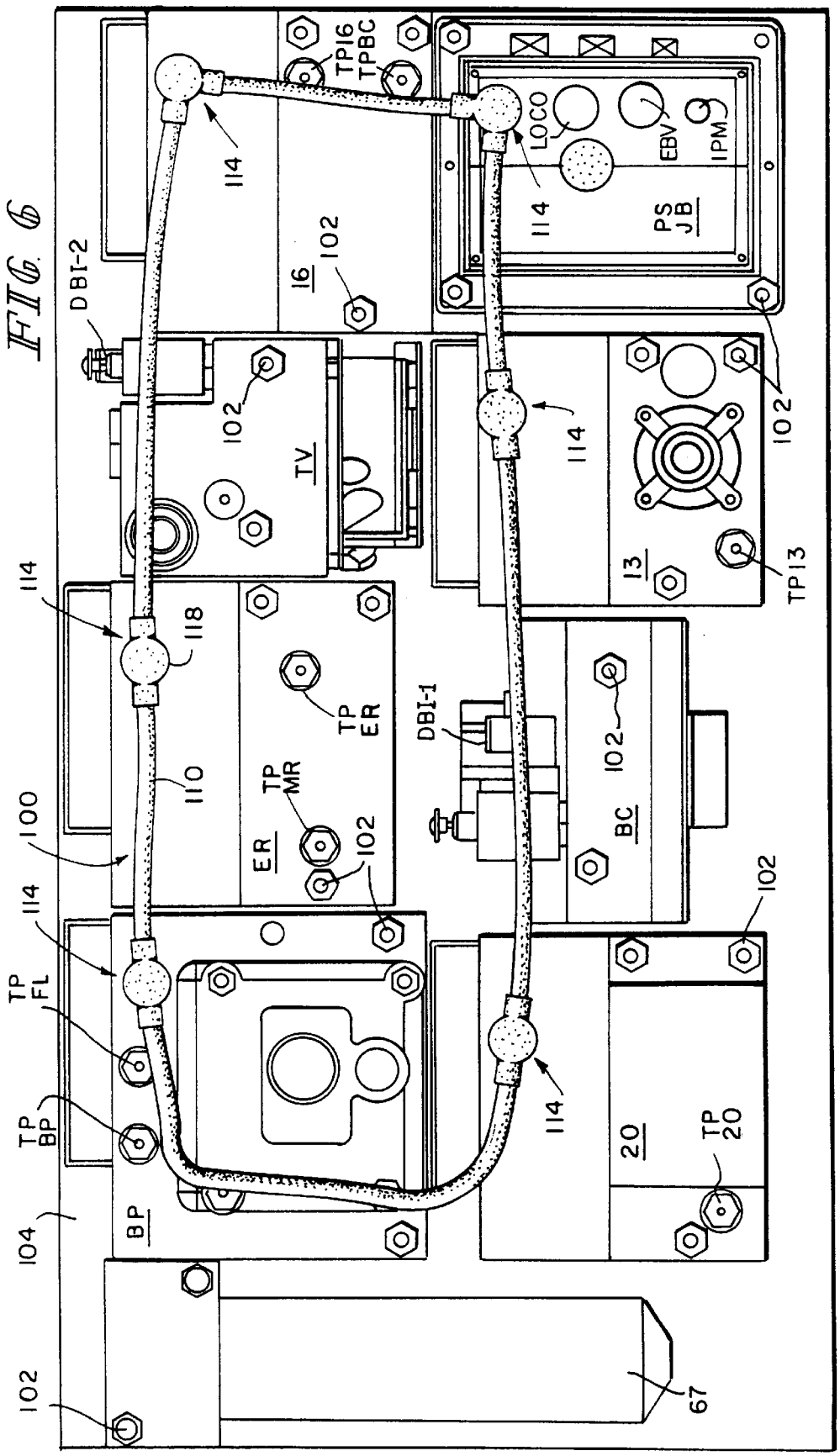
FIG. 6 is a plan view of the electropneumatic control unit incorporating the principles of the present invention.

A view of the individual line replaceable units or modules and interconnection by a single wire harness 100 is illustrated in FIG. 6. The wire harness 100 includes all of the electrical interconnection between the individual line replaceable units or modules with each other and to outside control signals via the power supply junction box PSJB. The wire harness 100 defines a path shown as a closed loop with a plurality of harness connectors 114 positioned along the path to mate with device connectors of the individual line replacement units or modules. All of the connections to all of the electrical or electropneumatic components, including electropneumatic valves, electrical sensors and other electronic elements within the modules are through the single device connector and its mating harness connector 114.

In the particular embodiment shown, there is no connection to the brake cylinder portion BC or the triple valve portion TV. In the preferred embodiment, each of these modules would include a control node or at least some form of communication and therefore, there would be a connection to these modules as well by the wire harness 100. These will all be discussed below. By using one wiring harness, the interconnectability and replacability is substantially simplified.

Besides the single portion connection or connector for all of the electrical wires using the wiring harness 100, each of the line replaceable modules include the appropriate test points TP physically on the module. Similarly, each of the modules include the required pressure transducers to be used by their local control node or microprocessor and connection as well as through the wiring harness.

A single sized fastener 102 is used to connect each of the line replaceable units to the manifold 104. It should be noted that all of the required filter 67 are also directly mounted to the manifold. By using a single size or headed fastener, a single tool can be used to remove all of the line replaceable units. It should also be noted that the line replaceable units are designed such as not to weigh more than, for example, 35 pounds. This allows an individual to easily remove and handle the line replaceable units or modules.

Figure 7:
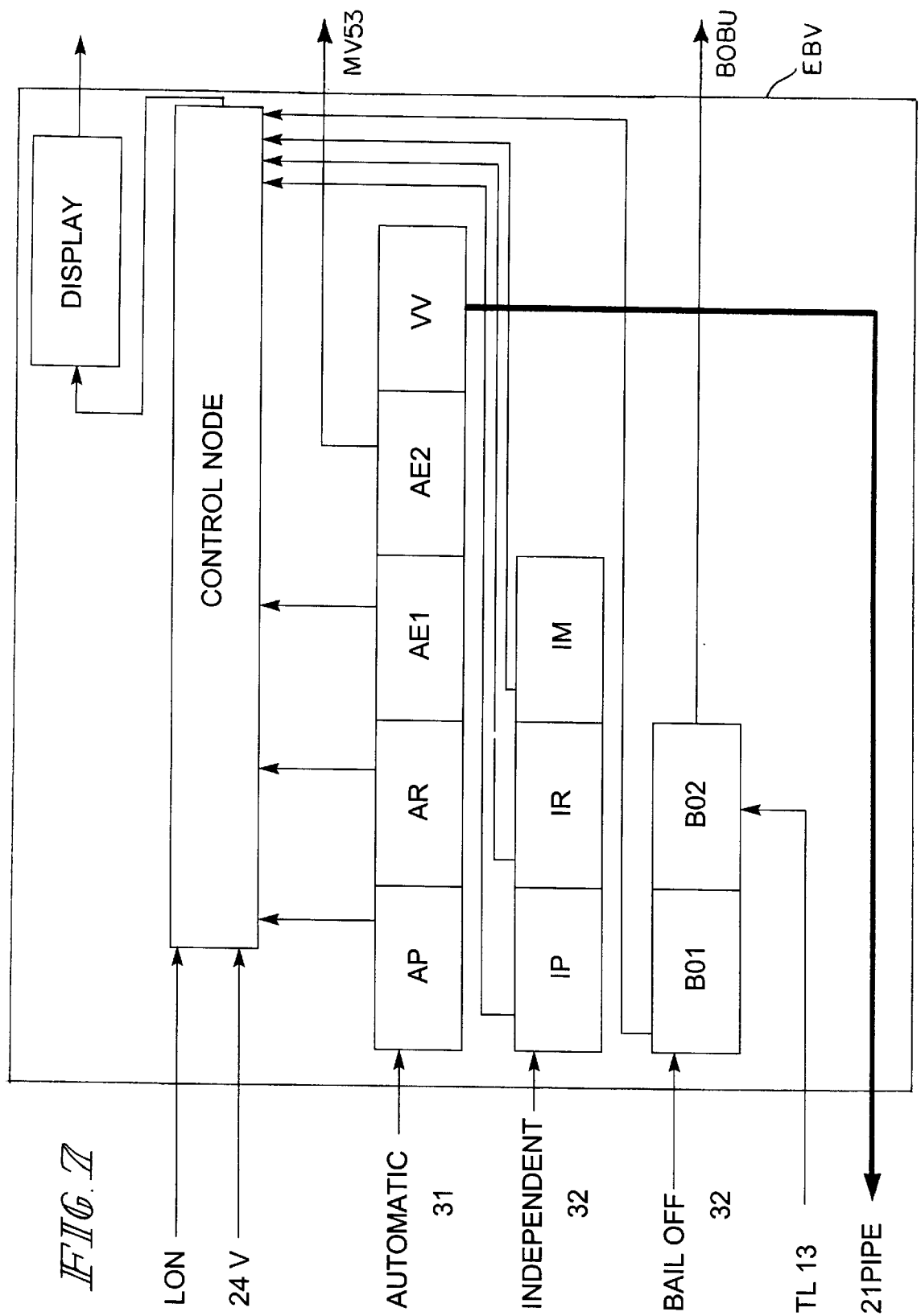
FIG. 7 is a block diagram of an electronic brake valve according to the principles of the present invention

A block diagram of the electric brake valve EBV is illustrated in FIG. 7. The control node includes communication with the Lon Networks and receives a 24 volt input. Connected to the control node is the display for the equalization reservoir target. The automatic brake handle 31 provides electrical inputs to electrical portions automatic apply, AP, automatic release, AR, automatic emergency 1 and 2, AE1, AE2 and vent valve VV. The output of the automatic apply and automatic release and automatic emergency AE1 are provided to the control node. The output of the automatic emergency AE2 is provided as an output signal MV53 to electromagnetic valve MV53 of the EPCU to vent the brake pipe. Also responsive to the electrical signal from the automatic brake handle 31, vent valve VV provides a pneumatic vent signal on pipe 21 also to vent the brake pipe in the EPCU.

The independent brake handle 32 provides an electrical signal to the control node via independent pressure section IP, independent release section IR and independent maximum section IM. The electronic bailoff signal from the independent handle portion 32B provides a first bailoff signal BO1 to the control node and a second bailoff signal from section B02 as a bailoff output signal BOBU to the bailoff portion of the EPCU.

Figure 8:
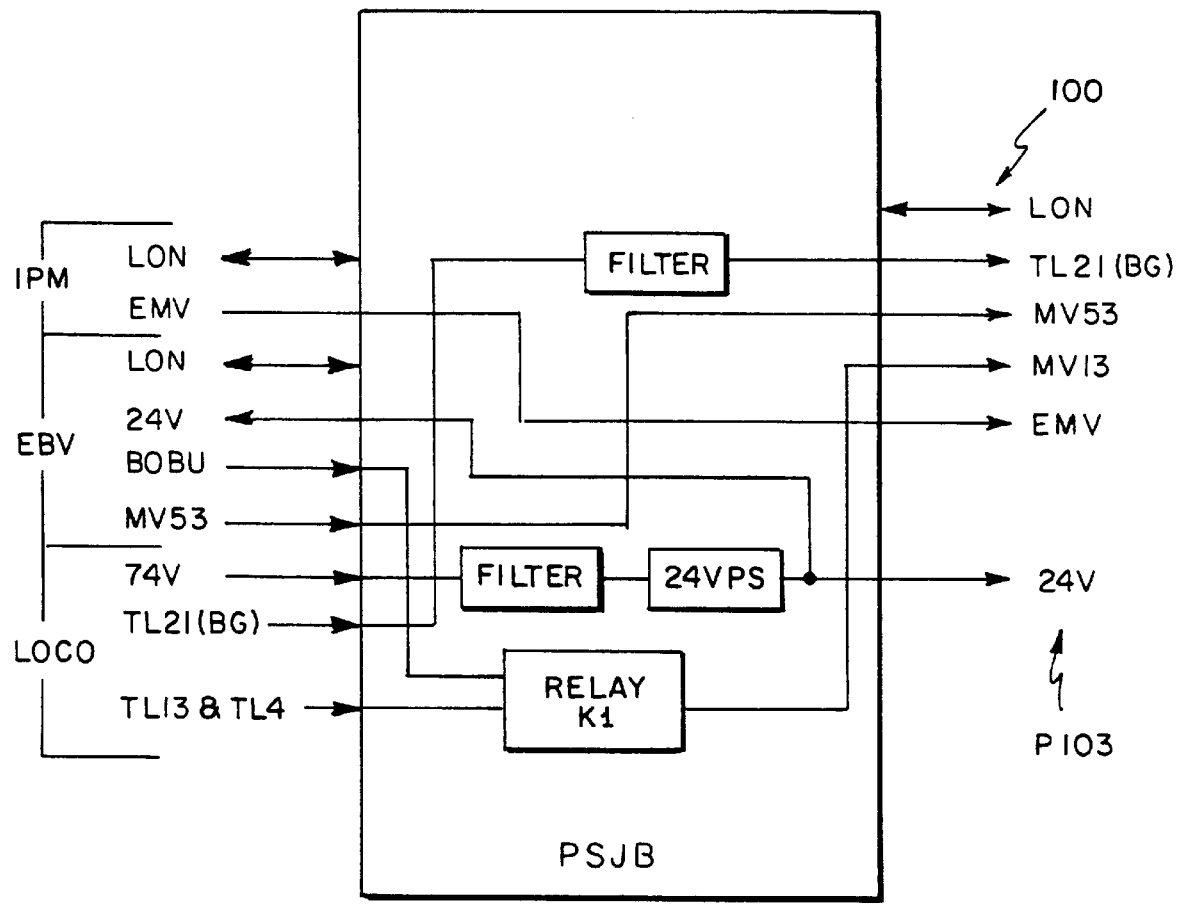
FIG. 8 is a block diagram of a power supply junction box according to the principles of the present invention.

A block diagram of the power supply junction box PSJB is illustrated in FIG. 8. The inputs from the locomotive are 74 volt input, trainline 21 which is the dynamic brake begin signal and trainlines 13 and 4 which are the positive and negative lines. The interface with the electric brake valve EBV are LonWorks communication line LON, and 24 volts power which is produced by a filter and 24 volt power supply from the 74 volt input from the locomotive. A bailoff back-up signal BOBU which provided to the relay K1 as an input to relay K1, and the vent signal MV 53 for magnetic valve 53 of the EPCU to vent the brake pipe. The input from the integrated process module IPM is the LonWorks line LON and the emergency vent signal EMV.

By mounting the power supply junction box PSJB on the manifold 104, the manifold acts as a heat sink for the power supply. This provides a substantial mass of metal as a heat sink. It reduces the physical size of the power supply since an additional heat sink is not required. The heat does not adversely affect the operation of the pneumatics.

The dynamic brake begin signal TL 21 is provided through a filter as an output to an output TL 21 to the line replaceable units. The bailoff back-up signal BOBU is provided through the relay K1 to magnetic valve MV13 of the line replaceable unit for the 13 portion. An automatic emergency signal MV 53 from the electrical brake valve is provided as an output MV 53 to the brake pipe control portion BPPC.

Although individual cables bring the input from the IPM, EBV and LOC to the power supply junction box, all of the electrical outputs to the line replacement units or modules are preferably via the wire harness 100. The embodiment shown in FIG. 6 where the brake cylinder control portion BCCP and the triple valve portion TV do not include electronic elements, in one embodiment, they may each individually include dynamic brake interlocks. In such a case, the dynamic brake interlock electrical signal TL 21, would be connected either individually by an individual wire or as part of the wiring harness 100.

Figure 9:
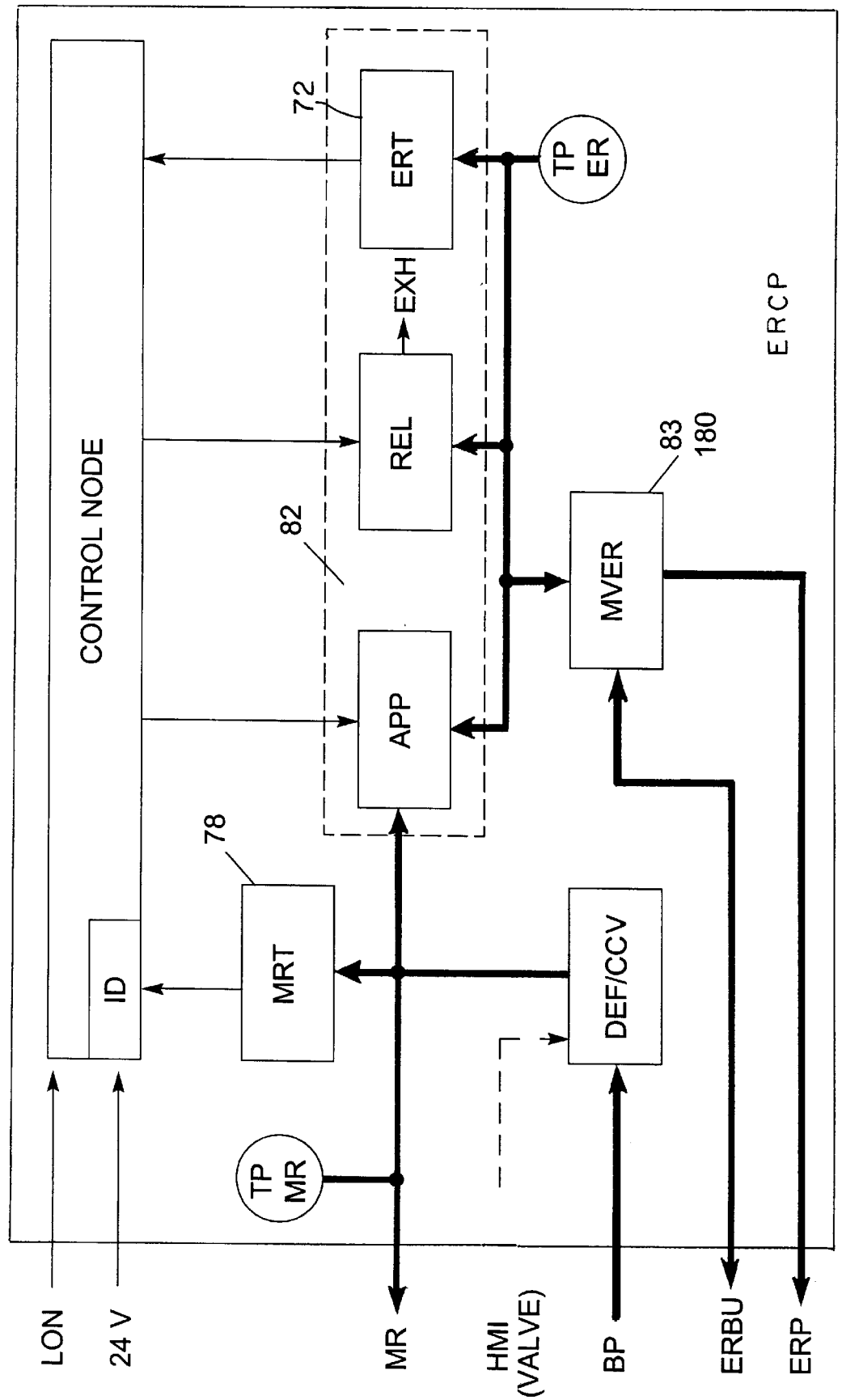
FIG. 9 is a block diagram of the equalization reservoir control portion according to the principles of the present invention.

The equalization reservoir control portion as illustrated in FIG. 9 includes a control node connected to the LON network and receiving a 24 volt supply. The main reservoir MR is connected to the equalization reservoir controller 82 which includes an apply and release valve and an equalization reservoir transducer 72 connected to the output thereof. A main reservoir transducer 78 is also included. The equalization reservoir test points ERTP and main reservoir test points MRTP are also provided on the ERCP module. The brake pipe is connected through DEF/CCV which includes a charging choke and check vale which allows charging of the main reservoir from the brake pipe. An equalization reservoir back-up signal ERBU from the 16 module is provided to the electropneumatic equalization reservoir (ER) select valve MVER 83/180. The ER select valves selects between the ERBU signal or the output of the ER pressure controller 82 of the control node. The electropneumatic valves of the ER pressure controller 82 are also controlled by the control node. The output of the ER select valve 83/180 is ERP which is a pressure that controls the pressure at the equalization reservoir.

Figure 10:
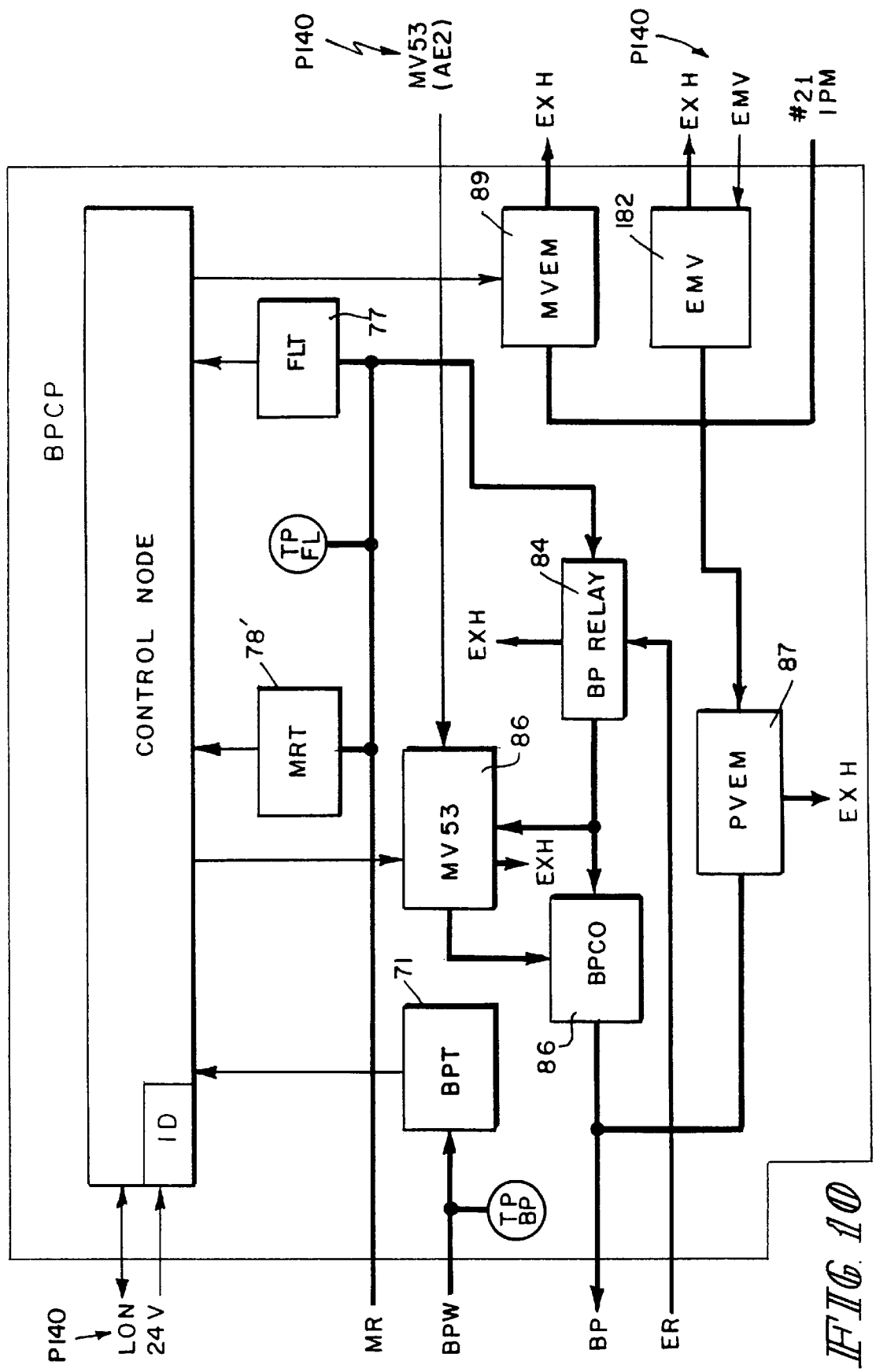
FIG. 10 is a block diagram of the brake pipe control portion according to the principles of the present invention.

The brake pipe control portion or module BPCP as illustrated in FIG. 10 includes a control node interconnected to the LON and receiving a 24 volt power signal. The main reservoir is connected to the brake pipe control module which includes a second main reservoir transducer 78' and main reservoir flow transducer 77. A flow test point TPFL is also provided. The main reservoir MR is also connected to the brake pipe relay valve 84 which receives a control signal from the equalization reservoir ER. The output of the brake pipe relay 84 is provided to the pneumatic brake pipe cut-off valve 86 which receives a control signal from an electropneumatic MV 53. MV 53 is controlled by the control node and also receives an electric signal MV 53 from the automatic handle 31 of the electric brake valve EBV as illustrated in FIG. 7 through the power supply junction box. The brake pipe transducer 71 is connected to the brake pipe at the vent valve at either end of the locomotive and provides its output to the control node. A brake pipe pressure test point TPBP is also provided. If the present locomotive is in the lead mode, it provides control of the brake pipe. If not, the brake pipe cut-off 86 is activated to isolate the brake pipe from the brake pipe control brake pipe relay 84.

The brake pipe control portion BPCP includes brake pipe venting independent of the brake pipe relay 84. A pneumatic brake pipe vent valve PVEM 87 vents the brake pipe in response to pneumatic signals. One of the pneumatic signals is the 21 pipe from the automatic handle 31 of the electric brake valve EBV of FIG. 7. The second pneumatic input for the brake pipe vent valve 87 is from electropneumatic valve MVEM 89. It receives its control signal from the local control node. The local control node monitors the brake pipe through the brake pipe transducer 71 and upon sensing an emergency reduction, activates the electropneumatic valve MVEM to activate the brake pipe vent valve 87 to immediately vent the brake pipe. This propagates and accelerates the emergency signal transmission down the brake pipe.

Different from the prior system of FIGS. 1 and 3, an additional electropneumatic valve, EMV 182 is provided to provide a pneumatic signal to activate the brake pipe vent valve 87 in response to an electrical signal EMV from the integrated process module IPM. The IPM provides back-up to the local control node and the electrical magnetic valve 89 and the electric brake valve EBV. The IPM may activate an emergency brake condition independent of the operator handle or brake pipe pressure.

Figure 11:
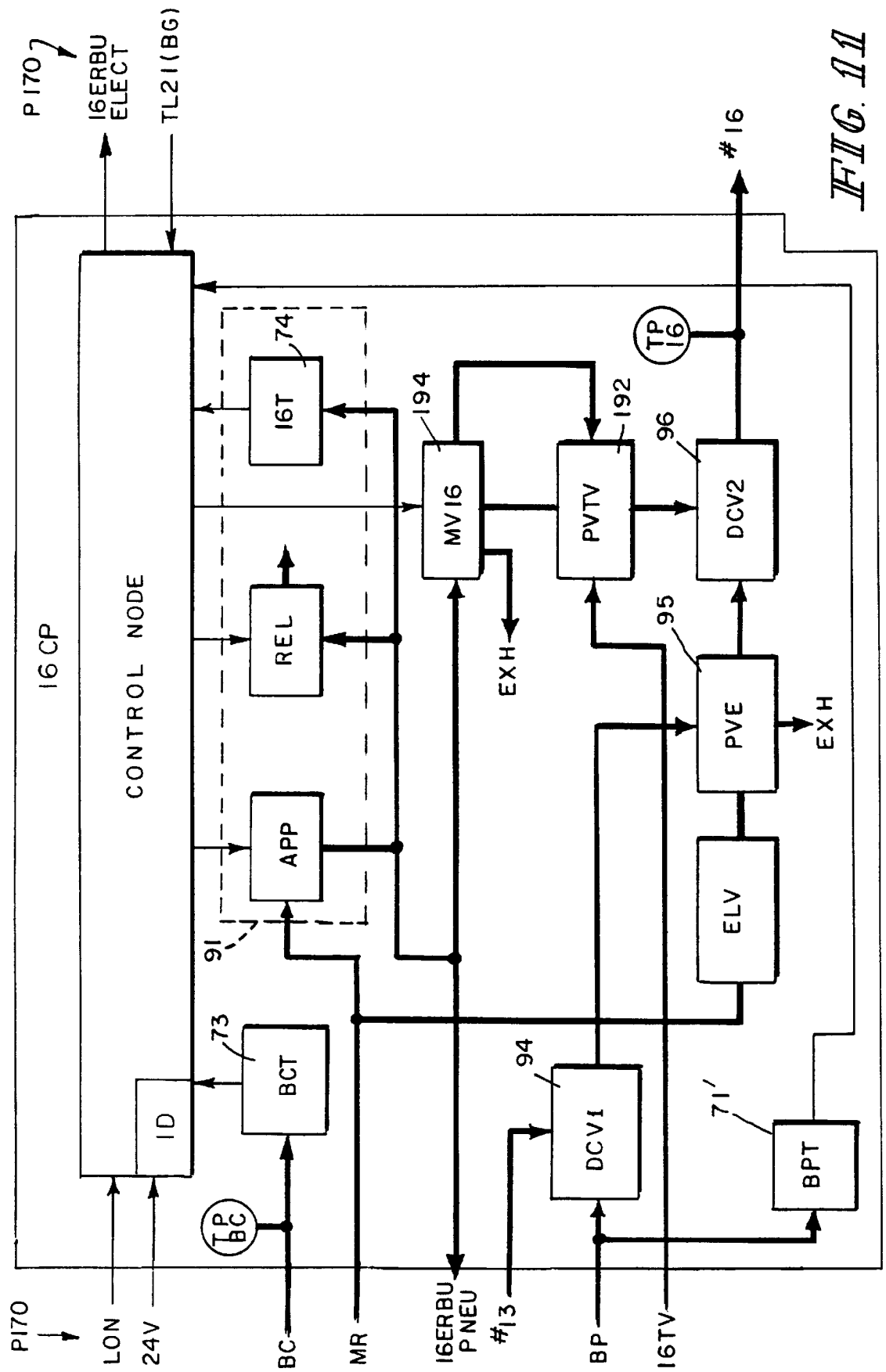
FIG. 11 is a block diagram of the brake signal or 16 pipe control portion according to the principles of the present invention.

The 16 pipe control portions 16CP or brake signal portion includes a control node connected to the LON works and receives the 24 volt power as shown in FIG. 11. The brake cylinder is monitored by brake cylinder transducer 73 and also includes a brake cylinder test point TPBC. The main reservoir MR is connected to the control reservoir pressure controller 91 which include apply and releases valves under the control of the control node with their output monitored by the 16 pipe transducer 74. The output of the control reservoir pressure controller 91, which is a train brake signal, is provided to electromagnetic MV16 under the control of the control node whose output is connected to a control reservoir select valve PVTV 192. The other input to the control reservoir select valve 192 is a control reservoir or train backup signal 16TV from the triple valve 93, illustrated in FIG. 15.

In normal operations, the select valve 192 selects the output of the control reservoir pressure controller 91 and provides its output to a double check valve 96. The other input of the double check valve 96 is from an emergency valve PVE 95 which receives its control input from a double check 94 which selects the higher of the brake pipe pressure BP or the actuating pipe pressure 13. A regulator valve ELV connects the main reservoir to the emergency valve 95.

The 16 control portion also includes a second brake pipe transducer 71'. Not only does the extra brake pipe transducer 71' act as a back-up to the brake pipe transducer 71 in the brake pipe control module of FIG. 10, but allows the control node of the 16 control portion to directly and independently determine brake pipe pressure. The output of the control reservoir pressure controller 91 is provided as a pneumatic signal 16 ERBU PNEU to an equalization reservoir select electropneumatic valve which is controlled by the electrical signal 16 ERBU ELECT from the control node of the 16 control portion. This allows the control node of the 16 control portion to operate the control reservoir pressure control 91 as a back-up for the equalization reservoir control module 82.

Figure 12:
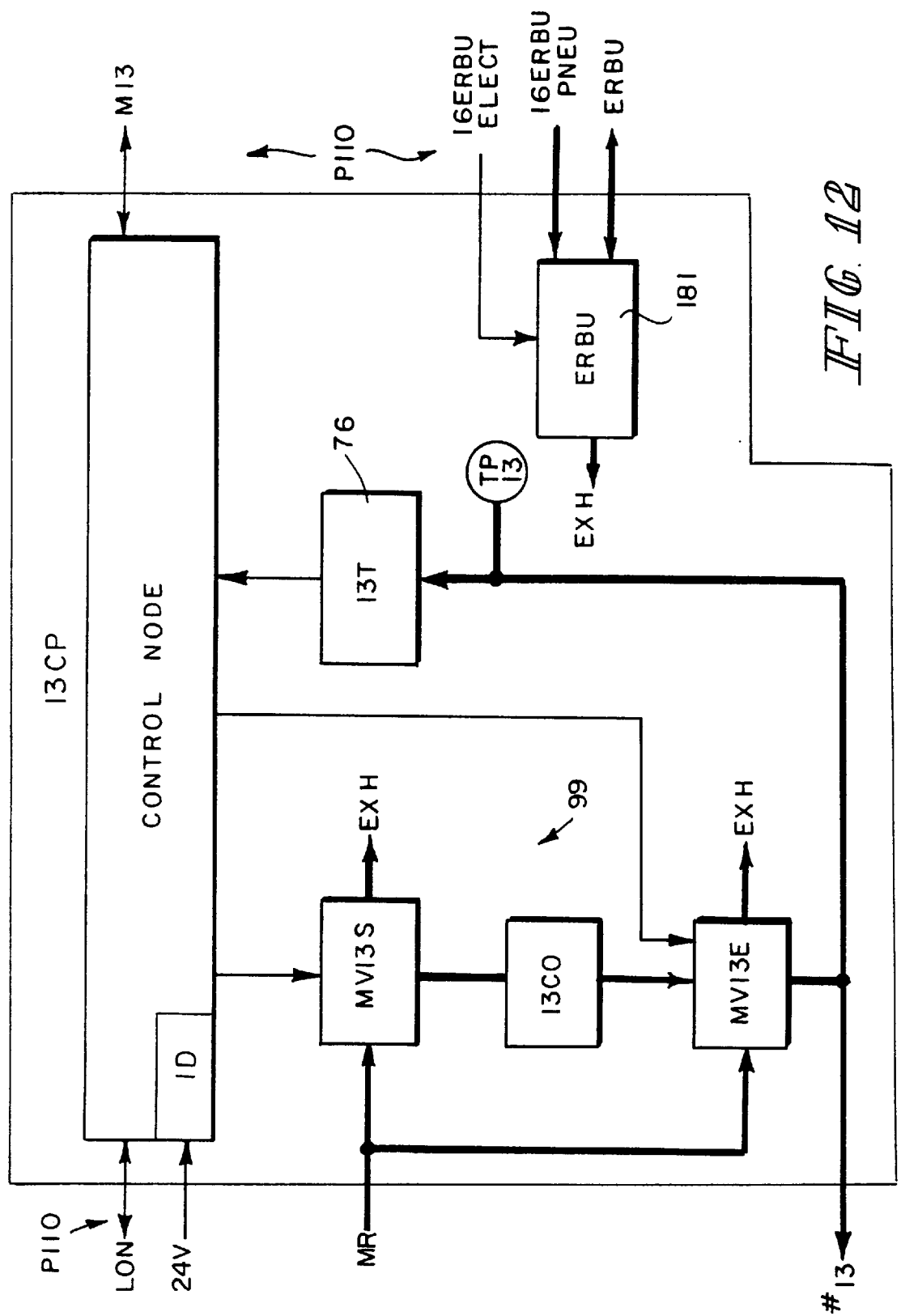
FIG. 12 is a block diagram of the actuating or 13 pipe control portion according to the principles of the present invention.
Figure 14:
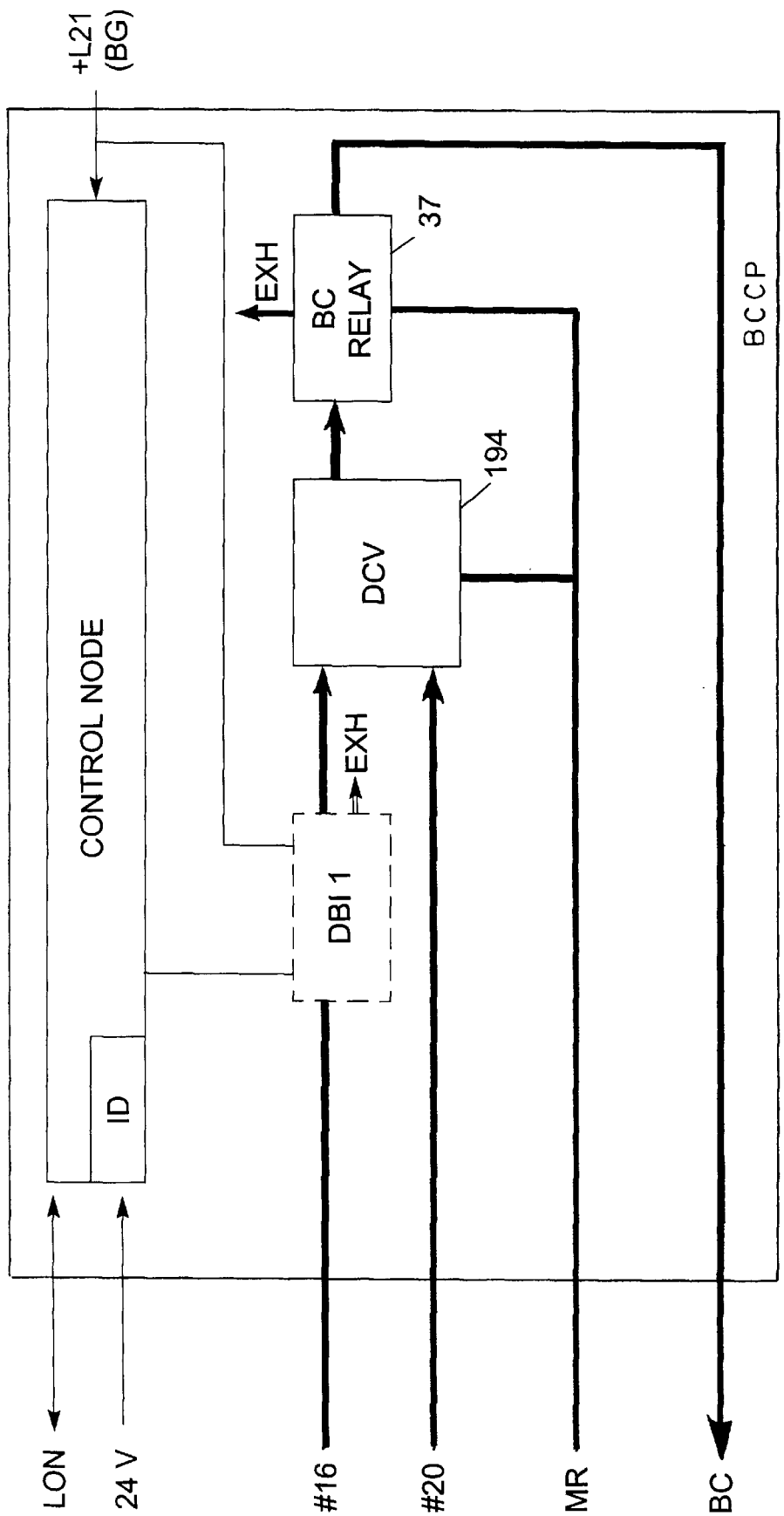
FIG. 14 is a block diagram of the brake cylinder control portion according to the principles of the present invention.
Figure 13:
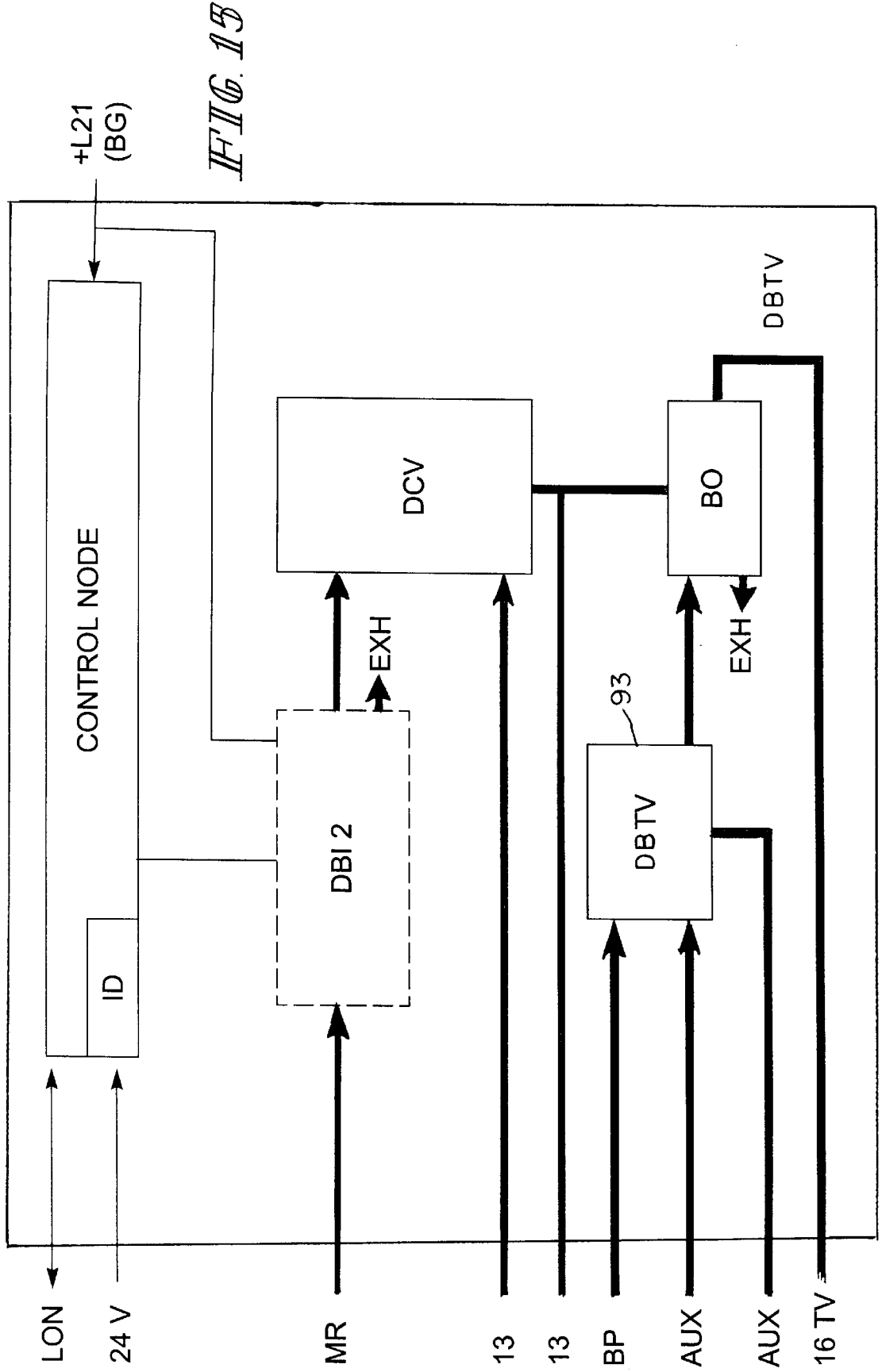

The equalization reservoir back-up valve 181, as illustrated in FIG. 14 is located in the 13 control portion, transmits the pneumatic 16 ERBU PNEU signal under the control of the electric 16 ERBU ELECT signal as the equalization reservoir back-up signal ERBU to the equalization reservoir select valve 180 in the equalization reservoir control portion of FIG. 9. It should be noted that the location of the equalization reservoir back-up valve 181 on the 13 or actuating portion of FIG. 12 is a matter of convenience and availability of real estate. Since the location can be anywhere within the system, preferably to be part of the 16 control portion of FIG. 11 or the equalization reservoir control portion of FIG. 9, but neither had sufficient space to accommodate an additional electropneumatic valve.

When the output of the control reservoir pressure controller 94 is used as the equalization reservoir back-up, the secondary brake signal 16TV from the triple valve 93 of FIG. 15 is provided as the brake signal input to the 16 pipe. As will be discussed with respect to FIG. 15, this is purely a pneumatically driven signal off the brake pipe and not an electrically controlled signal under a control node. A control node of the 16 control portion also receives the dynamic brake begin signal TL 21.

The 13 control or actuating pipe control portion 13CP as illustrated in FIG. 12 includes a control node receiving the LON Network and a 24 volt power line. It also receives an electrical input signal MV 13 which is an electrical bailoff signal from the electric brake valve EBV of FIG. 7 via the relay K1 of the power supply junction box of FIG. 8. The control module 13CP controls the 13 pipe by an actuating pressure controller 99 which includes an electropneumatic supply valve MV 13S, a pneumatic cut-off valve 13 CO and an electropneumatic vent valve NV 13E. A 13 transducer 76 is connected to the control node and a pressure test point TP13 is also provided in the 13 control portion.

Figure 13:
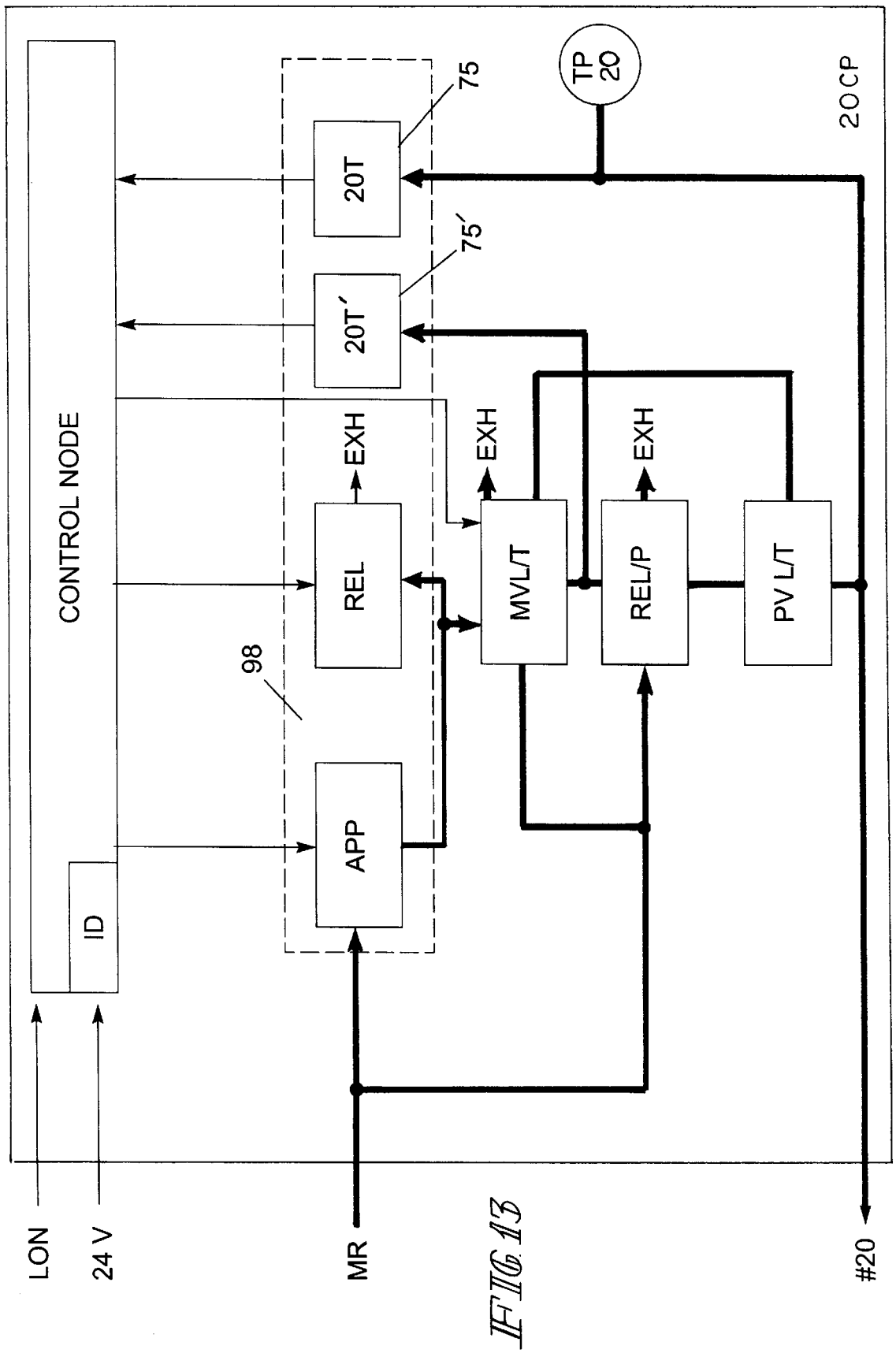
FIG. 13 is a block diagram of the independent or 20 pipe control portion according to the principles of the present invention.

The independent application and release or 20 control portion 20CP as illustrated in FIG. 13 includes a control node connected to the LON Network and receiving a 24 volt power supply. The control node controls the independent pressure controller 98 which includes an apply and release valve. A pair of 20 pressure transducers 75, 75' and a 20 pipe test point TP 20 are also provided in the module. The output of the independent pressure controller 98 is provided through an electropneumatic valve MVL/T to a relay valve REL/P. The output of the relay valve is provided by a piloted cut-off valve PVL/T to the 20 pipe port. The electropneumatic valve MVL/T also includes a cut-off valve portion to simultaneously disconnect the independent pressure controller 98 from the relay REL/P and to disconnect the output of the relay REL/P from the 20 pipe.

The brake cylinder control portion BCCP as illustrated in FIG. 14 includes a control node connected to the LON Network and receive a 24 volt power supply. The other input to the control node is the dynamic brake begin signal TL 21. As previously discussed, preferably a control node is provided. In the embodiment of FIG. 6, the control node is not provided and the TL 21 wire is connected directly to the dynamic brake interlock DBI1 illustrated in dash lines. A double check valve DCV 194 provides the higher of either the 16 pipe signal or the 20 pipe brake signal to control the brake cylinder relay 37 which controls the brake cylinder port BC.

A port is provided on the brake cylinder control portion BCCP to receive a resetting dynamic brake interlock DBI1 as illustrated in FIG. 6. If the dynamic brake interlock DBI1 is not provided in the port, the port is capped and there is a direct connection between the 16 pipe input and the double check valve 194. If a dynamic brake interlock DBI1 is provided, it is under the control of the control node in response to the dynamic brake begin signal TL 21, and will allow resetting of the pneumatic brake control after the dynamic brake is released.

The triple valve module of FIG. 15 includes a control node connected to the LON Network and receives a 24 volt power supply. As with the brake cylinder control portion, a dynamic brake signal TL 21 (BG) is provided to the control node to control a dynamic brake interlock DBI2. The control node may not be used and the signal may be connected directly to the dynamic brake interlock. The dynamic brake interlock DBI2 is shown in phantom. The dynamic brake interlock DBI2 is received in a port in the control in the triple valve control module, as shown in FIG. 6, between the main reservoir MR and a double check valve DCV. The dynamic brake interlock DBI2 is a non-resetting interlock. When the dynamic interlock DBI2 is not present, the main reservoir is blocked and the 13 pipe is connected directly to the bail-off valve BO. The electropneumatic control portion EPCU may include no dynamic brake interlock or a first or second, but not both. The second input to the double check valve DCV is the 13 pipe. Higher of the two signals is provided to a pneumatic bailoff valve as well being fed back to the 13 portion.

A triple valve DBTV is responsive to the difference in the brake pipe and an auxiliary reservoir pressure to charge the auxiliary reservoir from the brake pipe and to provide an output signal to the bailoff valve B0. The output of the bailoff valve is provided as a pneumatic secondary or back-up brake cylinder brake signal at output 16 TV. This is provided to the 16 portion.

Review of FIGS. 9–14 will indicate that each of the line replaceable units or modules include all of the pneumatic, electropneumatic and electrical sensors that are required for any given module on a functional basis. Not only the transducers, but the test points, are appropriately provided on the modules. This modular design makes ease of replacement modification and reconfiguration of the electropneumatic control unit EPCU. A review of FIGS. 9, 11 and 13 will also indicate that the equalization reservoir, the 16 and 20 control portions, all include a pair of electropneumatic apply and release valves as portions of AW4, which is a pulse width modulated analog control valve system, whose output is connected to at least one electropneumatic valve. This common structure is used to provide a common base module to which module specific auxiliary modules are connected. It should be noted that the pair of apply and release or supply and exhaust valves in the equalization reservoir, 16, 20 and 13 control portions may be a single three position valve or other equivalent valving.

Figure 16:
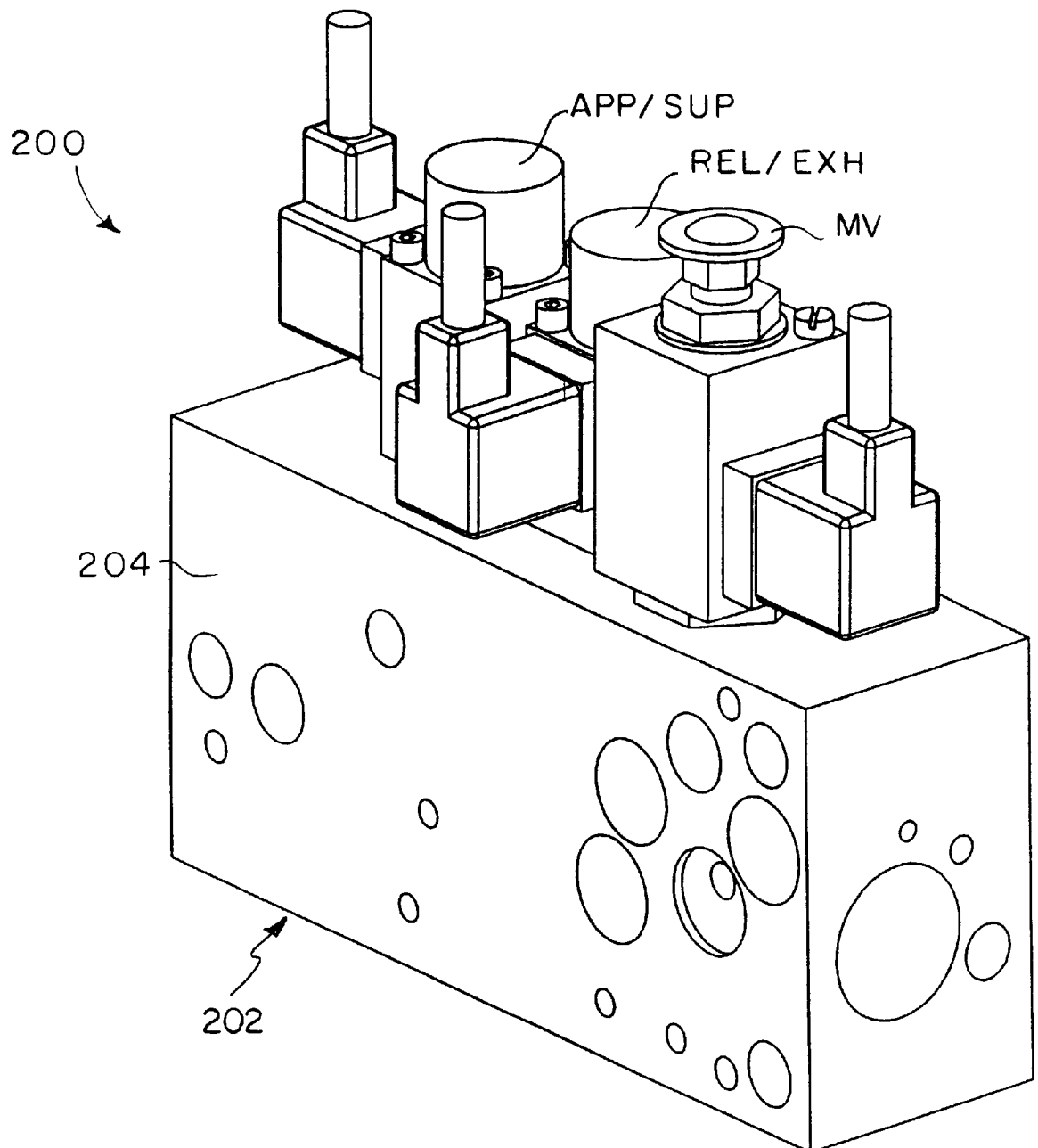
FIG. 16 is a respective view of a common block and valve module according to the principles of the present invention.

As illustrated in FIG. 16, a common block 200, cored to have the appropriate interconnections, has mounted thereto an apply or supply electromagnetic valve, a release or exhaust magnetic valve and an electromagnetic valve MV. The common block 200 has a first interface 202 on the back side of FIG. 16 which is connected to the manifold 104. The manifold 104 is cored to connect it to the appropriate ports and pneumatically to the other modules or line replaceable units. A second interface 204 is connected to the modular specific control portion thereof.

Figure 17:
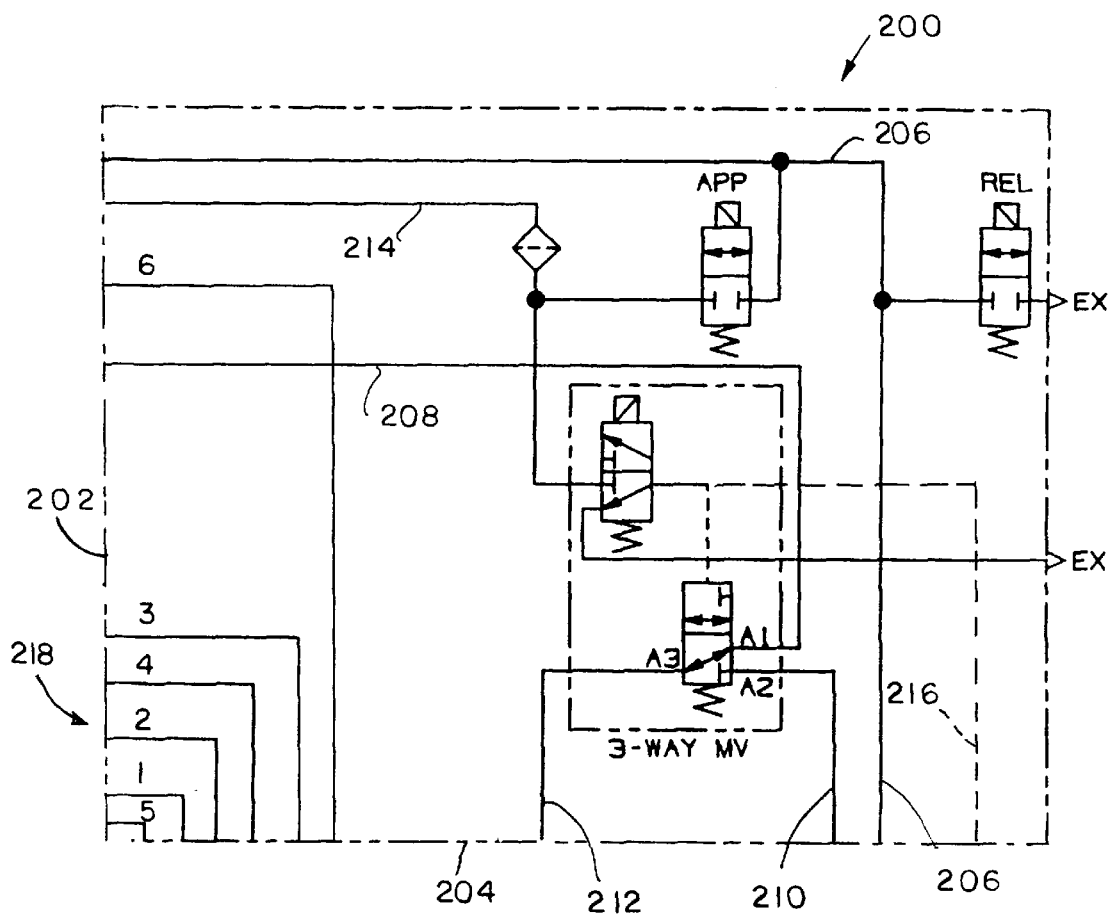
FIG. 17 is a fluid schematic of the common module of FIG. 16 according to the principles of the present invention.

The schematic of the common block 200 with the three electropneumatic valves connected thereto is illustrated in FIG. 17. A control passage 206 connects the output of the apply and release valves to the second interface 204 as well as to the first interface 202. The three-way magnetic valve MV includes a first input passage 208 connected to the first interface 202 and a second input passage 210 connected to the second interface 204. The output of the magnetic valve MV is connected by a passage 212 to the second interface 204. A supply passage 214 connects the first interface to the apply valve APP and the magnetic valve MV. Six auxiliary passages 218 connect the first and second interfaces 202 and 204. A pilot passage 216 also connects the pilot portion of the magnetic valve MV to the second interface 204.

Figure 18:
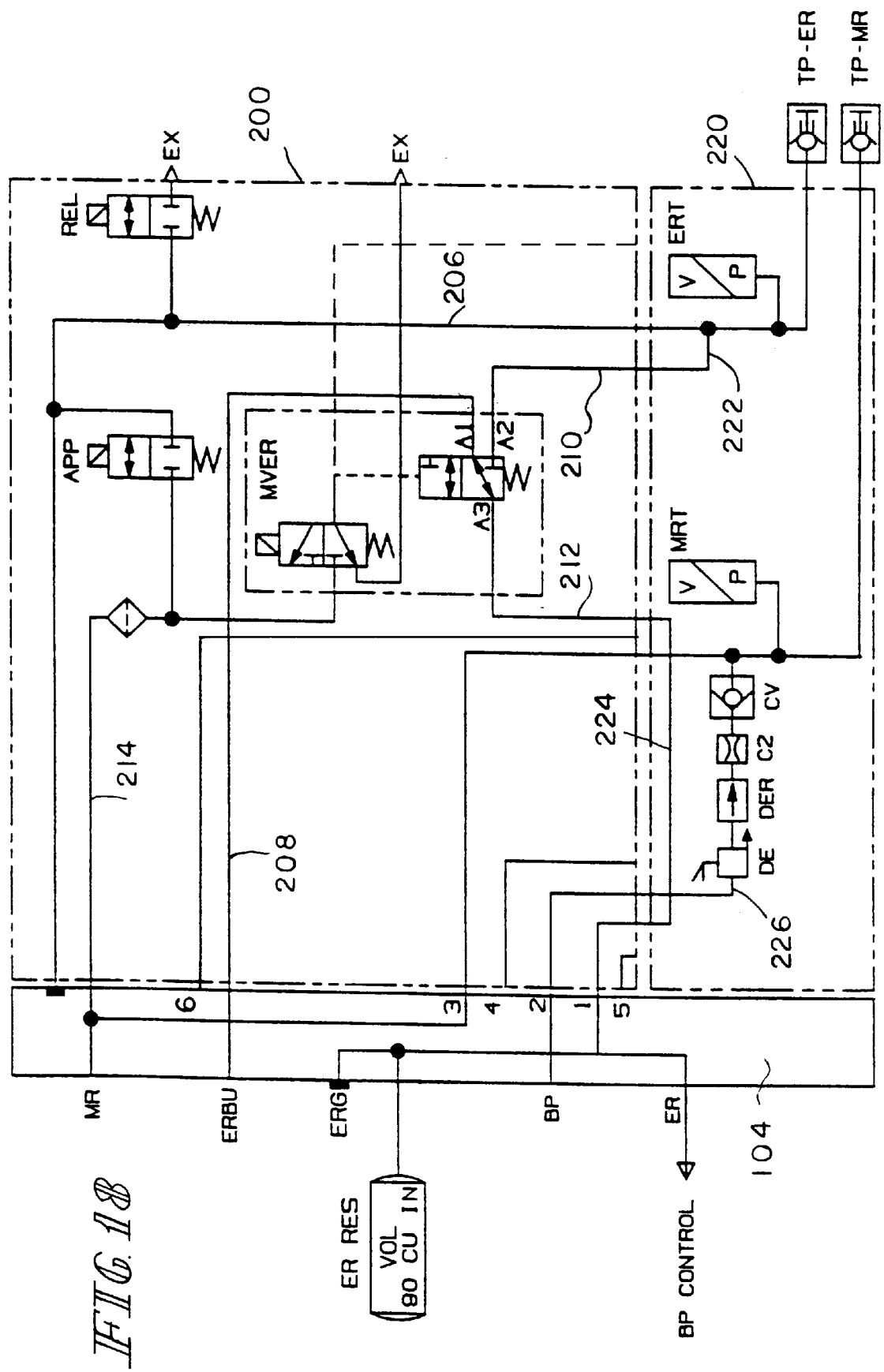
FIG. 18 is a pneumatic schematic of the equalization reservoir showing the common and its auxiliary block.
Figure 19:
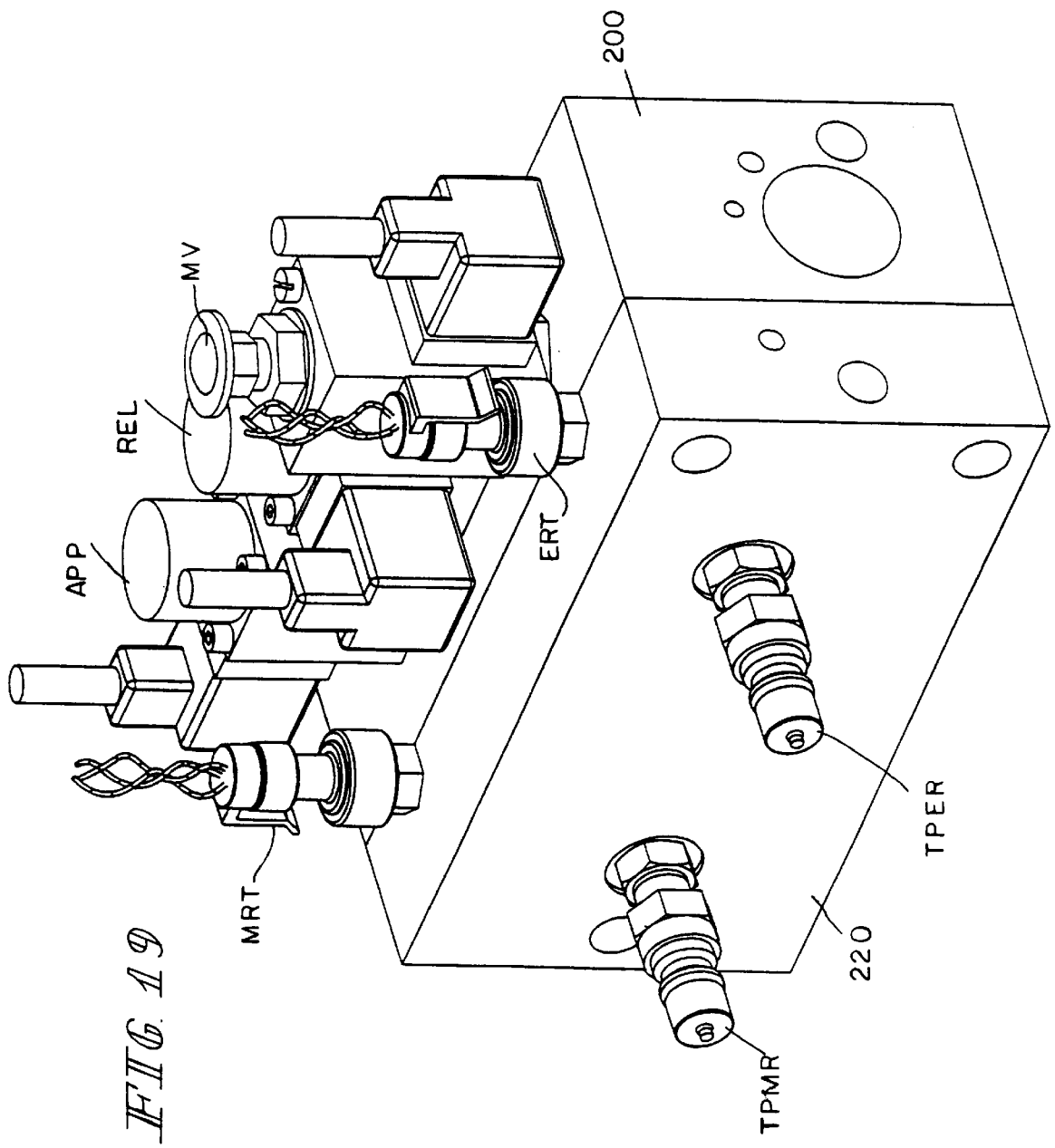
FIG. 19 is a perspective view of the equalization reservoir control portion with its common and auxiliary blocks.

The schematic of FIG. 18 and the perspective FIG. 19 show the equalization reservoir control portion EPCP with the common block 200 and an auxiliary block 220 connected thereto. The auxiliary block includes a passage 222 connecting the output passage 206 of the electropneumatic apply and release valves to the input 210 of the magnetic valve MVER. The ER transducer ERT and test point TPER are connected to the passage 222. The output of the magnetic valve MVER is connected through passage 224 in the auxiliary block 220 to the first auxiliary passage 1 in the common block 200. The connections are through the manifold 104. The second auxiliary passage 2 connects the brake pipe through regulators/charging choke and check valve to auxiliary passage 3 to charge the main reservoir connected to supply passage 214. The main reservoir transducer MRT and test point TPMR are also provided on this interconnection in the auxiliary block 220. The input passage 208 of the common block 200 is connected to the equalization reservoir back-up signal ERBU.

Figure 20:
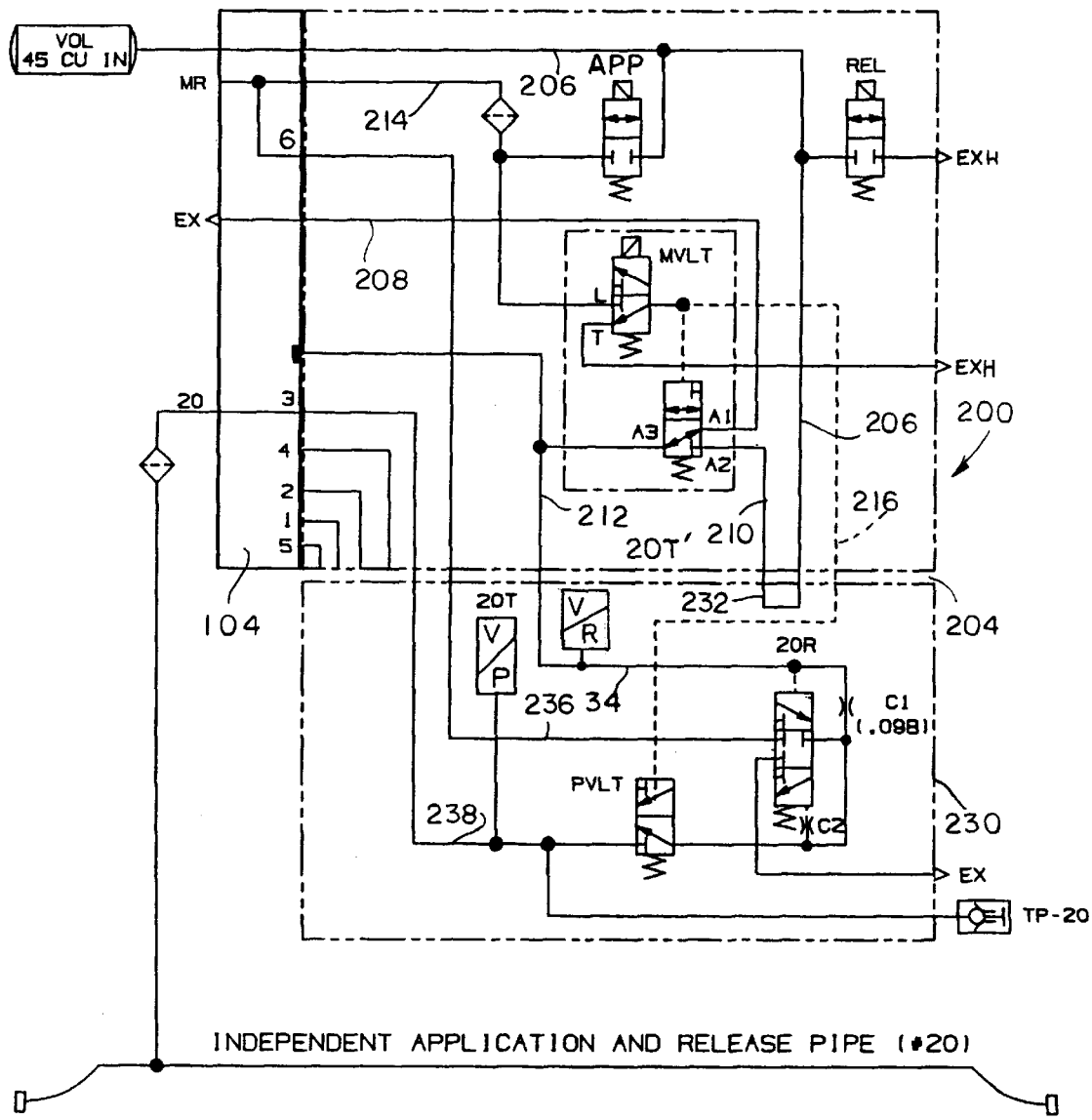
FIG. 20 is a pneumatic schematic of the independent or 20 pipe control portion with its common and auxiliary blocks.
Figure 21:
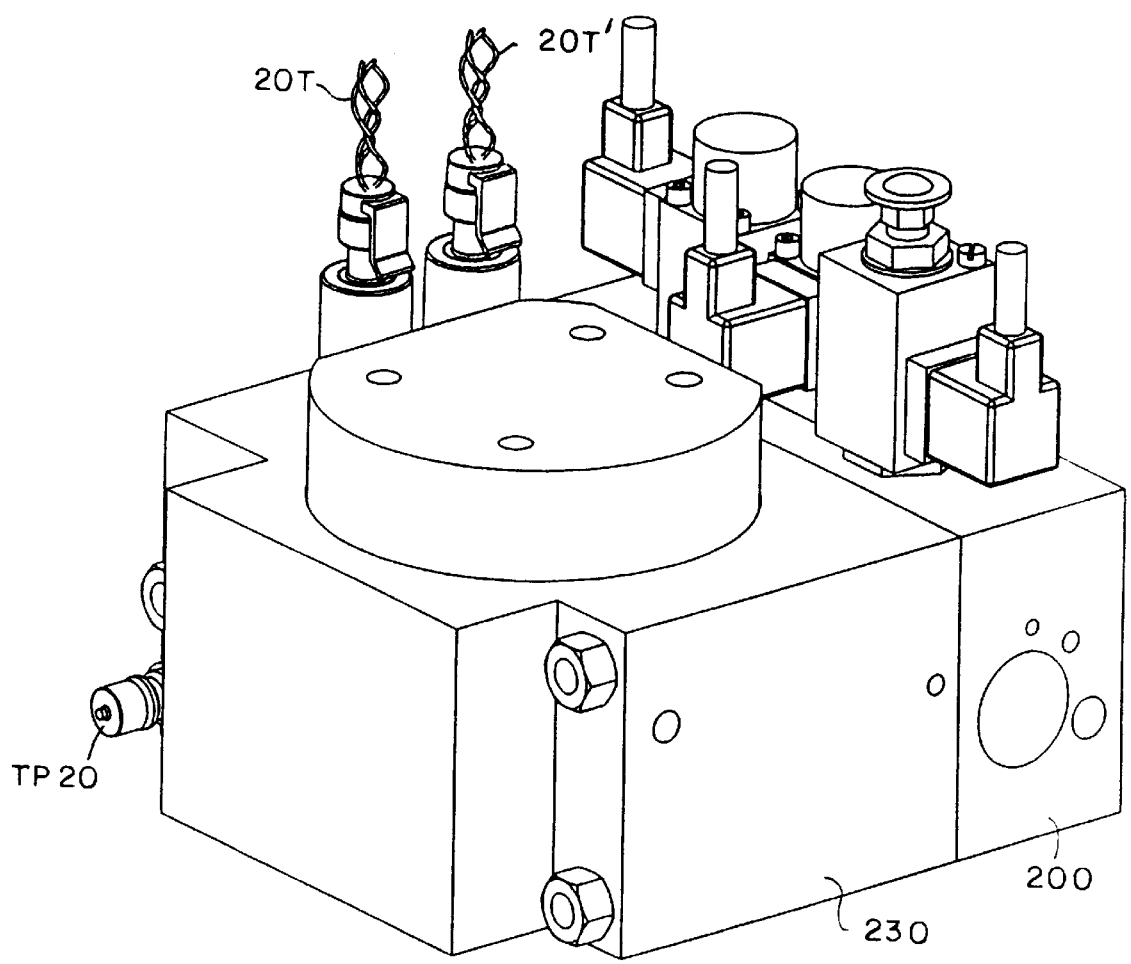
FIG. 21 is a perspective of the 20 pipe common and auxiliary blocks.

The 20 control portion 20CCP is shown in FIGS. 20 and 21 and includes the common block 200 and an auxiliary block 230. The auxiliary block 230 includes a passage 232 connecting the output passage 206 of the supply and release valves to the input passage 210 of the magnetic valve MVLT. The other input 208 is connected to the exhaust. The output 212 of the magnetic valve is connected via passage 234 in the auxiliary block 230 to the 20 pipe relay 20R. The other input through passage 6 in the auxiliary block 230 and the auxiliary passage in the common block 200 is connected to the main reservoir. The output of the 20 relay is connected via passage 230 in the auxiliary reservoir 230 to the auxiliary passage 3 in the common block 200, thus connected to the 20 pipe. A pilot passage 239 in the auxiliary block 230 is connected to a pilot passage 216 in the common block 200. The auxiliary block 230 includes a pair of 20 pipe transducer 20T, 20T' and the test points TP 20.

Figure 22:
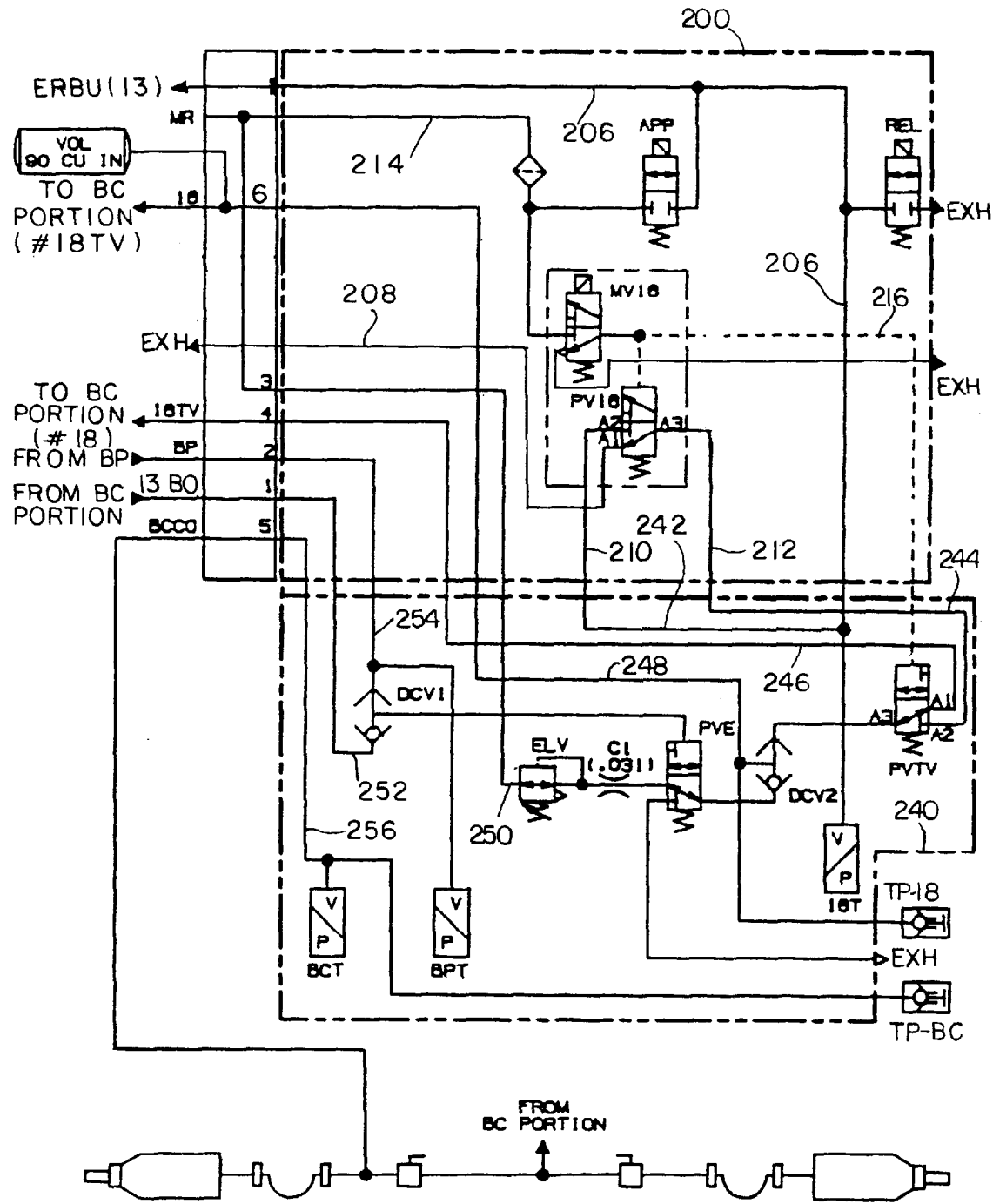
FIG. 22 is a pneumatic schematic of the brake signal or 16 pipe common and auxiliary blocks.
Figure 23:
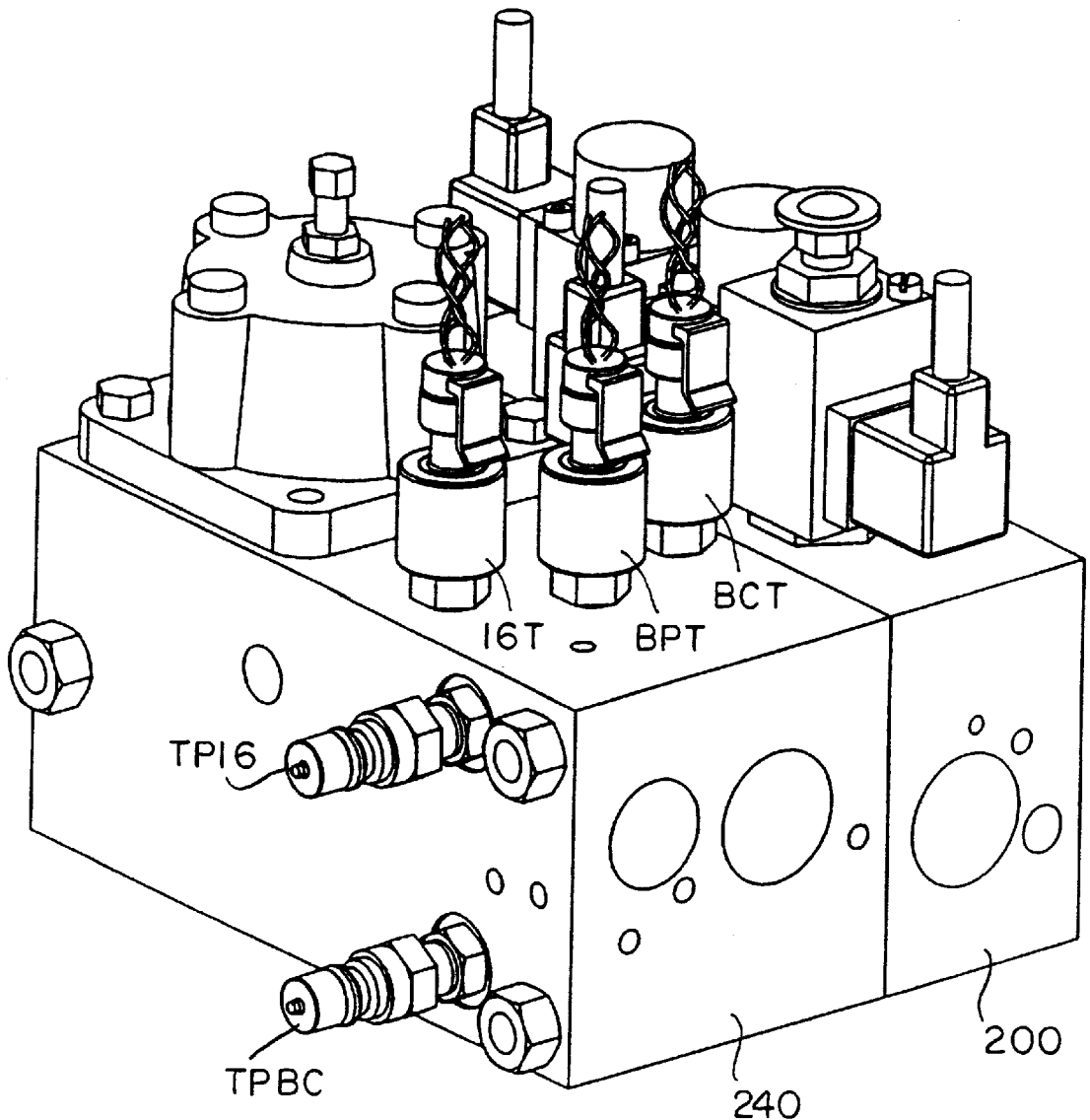
FIG. 23 is a perspective view of the 16 pipe common and auxiliary blocks.

FIGS. 22 and 23 show the 16 control portion 16CP including the common block 200 and auxiliary block 240. The auxiliary block 240 has a passage 242 connecting the output of the apply and release passage 206 to the input passage 210 of the magnetic valve MV16. The other input on passage 208 is to exhaust. The output of passage 212 of the magnetic valve MV16 is connected via passage 244 in the auxiliary block 240 to valve PVTV which receives its pilot signal from pilot passage 216. The output of valve PVTV is connected to a double check valve DCV2 which receives another input. Its output is connected through a passage 248 to the 6 auxiliary passage in the common block 200. The other input to the double check valve DCV2 is from passage 250 in the auxiliary block 240 which is connected to auxiliary passage 3 in the common block 200 via piloted valve PVE. The control of pilot valve PVE is from double check valve DCV1 which provides the higher of two signals on passage 252 connected to auxiliary passage 1 in the common block 200 and the passage 254 connected to common passage 2 of the common block 200. A passage 256 in the auxiliary port block 240 is connected to passage 5 in the common block 200. Transducer 16 T is connected to passage 242, brake pipe transducer BPT is connected to passage 254 and brake cylinder transducer BCT is connected to passage 256. The test point TP 16 is connected to passage 248 and test point TPBC is connected to passage 256.

As can be seen from the FIGS. 16–23, the common block 200 includes common pneumatic and electropneumatic elements and appropriate passages to be used in three different control portions where an auxiliary block with the modular specific electrical, pneumatic and electropneumatic components are mounted.

The control nodes of each of the modules or line replaceable units of the electropneumatic control is made of a single design. The control node provides electrical control of the control portion and communication with other modules as well as the rest of the system by transmitting commands and data over the LonWorks Network. The control node reads analog transducers and drives the magnetic valves on the control portion with its designated function and the commands it has received. The operation of the control node is controlled by software which is reprogrammable in the field. It is also capable of maintaining a history or a log of the control portion and system information which is important for its operational reliability as well as information which is available for diagnostics and trouble shooting.

Each of the electric pneumatic control unit include a module ID. This ID is stored in its control node or other storage device on the module. This module ID is communicated to the integrated processor module IPM. The IPM can keep a log of the specific ID of the individual modules. No two modules will have a duplicate number. Thus, the IPM can keep a log of which units are in the system, how long they have been in the system and what conditions they have been exposed to, and also verify in the look-up table whether that ID is an appropriate structured module for the train configuration. Also, if defects are sensed for that module, the control node and IPM can record such information. Also, since each of the modules are line replaceable units, and include a control node with its memory, it can also record events and data for future use and diagnostics when the system is taken in for repair or the individual modules are removed or tested.

The IPM can use the module ID to detect when a module has been replaced and then use this knowledge to clear the event log for its summary, and predictive summary files for the new module. The control nodes also have the capability to have new versions of application software down loaded. The IPM can also use the program revision to determine whether modules of the system are running compatible versions of the software. Because of the distributed design, this is important. Each of the control nodes can record an event log. The event log is a data store that contains run time information. The system can include background diagnostic, predictive diagnostic and maintenance information and self-test failure to program errors. By providing a local controller to each module, the modules are substantially intelligent allowing communication with other modules and the system as well as maintaining a history or log of events, unique to that particular module.

With respect to the history, the IPM can test and monitor the system at power-up or when a new module is added. The information on the module is an identification number ID, the revision level of its software, history of what system it has been on with date and time. It may also include module faults and a short snapshot of the system variables at failure. It may also include, for example, the cycle counts for apply and release valves. The collection of this information at the individual modules, by the IPM, allows analysis and early repair of parts with or without failure, even without failure during normal maintenance or when the locomotive is brought into the yard.

With respect to the 16 control portion, the control node 16 may include the software to operate as a 16 control valve and the software to operate the equalization reservoir portion. Alternatively, it may include only the software to operate as a 16 portion with the software for the equalization reservoir down loaded upon a change of its roles.

Although the control nodes are Neuron chips are part of the LonWorks, the control node may also be a microcomputer in a computer network.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a locomotive brake control unit including a manifold having mounted thereto a) a brake pipe module controlling pressure at a brake pipe port, b) a brake cylinder module controlling pressure at a brake cylinder port, c) an equalization reservoir module controlling pressure at an equalization reservoir port, d) an independent brake module controlling pressure at an independent brake port, and e) a brake signal module providing pneumatic train brake signals to said brake cylinder module, wherein at least two of said equalization reservoir, independent brake and brake signal modules each comprises:

a common configured block mounted to said manifold at a first interface;

common electropneumatic supply and exhaust valve mounted to said common block;

a module specific auxiliary block mounted to said common block at a second interface; and module specific pneumatic and electrical elements mounted on said auxiliary block.

2. A control unit according to claim 1, wherein said common block includes a first passage connecting an output of said supply and exhaust valve to said first and second interfaces.

3. A control unit according to claim 1, wherein said common block includes a supply passage connecting said first interface to an input of said supply and exhaust valve.

4. A control unit according to claim 1, wherein said common block includes:

an electropneumatic valve having first and second inputs and an output;

first and second input passages connecting said first and second inputs to said first and second interfaces respectively; and an output passage connecting said output to said second interface.

5. A control unit according to claim 4, wherein:

said common block includes a supply passage connecting said first interface to said supply and exhaust valve; and said electropneumatic valve includes a pneumatic portion having said first and second inputs, said output and a control input, and includes an electropneumatic portion connected to said supply passage and said control input to control said pneumatic portion.

6. A control unit according to claim 4, wherein:

said common block includes a first passage connecting an output of said supply and exhaust valve to said second interface; and said auxiliary blocks each include an interconnect passage interconnecting said first passage and said second input passage at said second interface.

7. A control unit according to claim 6, wherein said equalization reservoir module's auxiliary block includes an equalization electric pressure transducer and an equalization pressure test port connected to said interconnect passage.

8. A control unit according to claim 6, wherein said brake signal module's auxiliary block includes a brake signal electric pressure transducer connected to said interconnect passage.

9. A control unit according to claim 4, wherein:

said common block includes a second passage interconnecting said first and second interfaces; and said independent brake module's auxiliary block includes a relay valve having a control input, supply input and an output, includes an input passage connecting said control input to said output passage of said common block at said second interface, and includes an output passage connecting said output of said relay valve to said second passage at said second interface.

10. A control unit according to claim 9, wherein said independent brake module's auxiliary block includes an independent brake supply electric pressure transducer and an independent brake pressure test port connected to said output passage of said relay.

11. A control unit according to claim 1, wherein said common block includes at least one second passage interconnecting said first and second interfaces.

12. A control unit according to claim 11, wherein said auxiliary blocks each include a transducer passage connected to said second passage at said second interface and an electrical pressure transducer connected to said transducer passage.

13. A control unit according to claim 12, wherein said auxiliary blocks each include a test port connected to said transducer passage.

14. A control unit according to claim 1, wherein:

said common block includes two second passages interconnecting said first and second interfaces;

said second passages of said equalization reservoir module are connected at said first interface to said brake pipe and said supply ports respectively; and said auxiliary block of said equalization reservoir module includes a charging choke and a check valve interconnecting said brake pipe and said supply port second passages at said second interface.

15. A control unit according to claim 14, wherein said equalization reservoir module's auxiliary block includes a supply electric pressure transducer and a supply pressure test port connected to said supply port second passages at said second interface.

16. In a locomotive brake control unit including a manifold having mounted thereto an equalization reservoir module controlling pressure at said equalization reservoir port, wherein the equalization reservoir module comprises:

a block removably mounted to said manifold at a first interface;

an electropneumatic supply and exhaust valve on said block;

an equalization electric pressure transducer on said block; and electropneumatic valve on said block selectively connecting said supply and exhaust valve or a brake signal from the manifold to said equalization reservoir port.

17. A control unit according to claim 16, including on said block a charging choke and a check valve connecting a brake pipe port and a supply port on the manifold.

18. A control unit according to claim 17, including on said block a supply electric pressure transducer.

19. A control unit according to claim 16, including on said block an electronic controller connected to the supply and exhaust valve, the pressure transducer and the electropneumatic valve.

20. In a locomotive brake control unit including a manifold having mounted thereto an independent brake module controlling pressure at an independent brake port on the manifold, wherein the independent brake module comprises:

a block removably mounted to said manifold at a first interface;

an electropneumatic supply and exhaust valve on said block;

an independent brake electric pressure transducer on said block;

relay valve on said block for controlling said independent brake port in response to a control signal; and an electropneumatic valve on said block connecting said supply and exhaust valve to said relay valve as said control signal.

21. A control unit according to claim 20, including on the block an electronic controller connected to the supply and exhaust valve, the pressure transducer and the electropneumatic valve.

22. In a locomotive brake control unit including a manifold having mounted thereto a brake signal module providing pneumatic train brake signals to the manifold, wherein the brake signal module comprises:

a block removably mounted to said manifold at a first interface;

an electropneumatic supply and exhaust valve on said block;

a brake signal electric pressure transducer on said block;

a first select valve selecting between a primary brake signal and a backup brake signal as said pneumatic train brake signals in response to a control signal;

an electropneumatic valve on said block connecting said supply and exhaust valve to said first select valve as said control signal and said primary brake signal; and said backup brake signal being from said manifold.

23. A control unit according to claim 22, including on the block an electronic controller connected to the supply and exhaust valve, the pressure transducer and the electropneumatic valve.

24. A control unit according to claim 22, including on the block a second select valve selecting between a brake pipe signal received from said manifold and the train brake signal from the first select valve to provide as said pneumatic train brake signals.

25. A control unit according to claim 24, including on said block a brake pipe electric pressure transducer.

26. In a locomotive brake control unit including a manifold having mounted thereto an actuating module controlling pressure at an actuating pipe port on the manifold, wherein the actuating module comprises:

a block removably mounted to said manifold at a first interface;

an electropneumatic supply and exhaust valve on said block;

an actuating port electric pressure transducer on said block; and a cutoff valve on said block connected to said supply and exhaust valve.

27. A control unit according to claim 26, including on the block an electronic controller connected to the supply and exhaust valve and the pressure transducer.

28. In a locomotive brake control unit including a manifold having mounted thereto a brake pipe module controlling pressure at a brake pipe port in response to pressure at an equalization reservoir port on the manifold, wherein the brake pipe module comprises:

a block removably mounted to said manifold at a first interface;

a pneumatic brake pipe relay valve on said block responsive to equalization reservoir pressure to control said brake pipe port;

a cutoff valve on said block connecting an output of the brake pipe relay valve to the brake pipe port in response to a control signal;

an electropneumatic valve on said block providing said control signal to said cutoff valve; and a brake pipe electric pressure transducer on said block.

29. A control unit according to claim 28, including on the block an electronic controller connected to the supply and exhaust valve and the pressure transducer.

30. A control unit according to claim 28, including on the block a pneumatic emergency vent valve responsive to said brake pipe port pressure for venting said brake pipe port.

31. A control unit according to claim 28, including on the block an electropneumatic valve for venting said brake pipe port.

32. A control unit according to claim 28, including on the block an electrical brake pipe flow transducer and an electrical supply pressure transducer.

33. A modular locomotive brake control unit comprising:

a manifold having brake pipe, brake cylinder, equalization reservoir, supply and independent brake ports;

an electropneumatic equalization reservoir module removably mounted on said manifold and controlling pressure at said equalization reservoir port;

a brake pipe module removably mounted on said manifold and controlling pressure at said brake pipe port in response to equalization reservoir port pressure;

an electropneumatic independent brake module removably mounted on said manifold and controlling pressure at said independent brake port as a locomotive brake signal;

an electropneumatic brake signal module removably mounted on said manifold and providing a pneumatic train brake signal;

a brake cylinder module removably mounted on said manifold and controlling pressure at said brake cylinder port in response to said train and locomotive brake signals;

a controller controlling said electropneumatic modules;

each of said electropneumatic modules including electropneumatic and pneumatic elements;

each of said electropneumatic modules including a test port and an electrical transducer; and each module is removable as a unit from said manifold.

34. A modular locomotive brake control unit comprising:

a manifold having brake pipe, brake cylinder, equalization reservoir, supply and independent brake ports;

an electropneumatic equalization reservoir module removably mounted on said manifold and controlling pressure at said equalization reservoir port;

a brake pipe module removably mounted on said manifold and controlling pressure at said brake pipe port in response to equalization reservoir port pressure;

an electropneumatic independent brake module removably mounted on said manifold and controlling pressure at said independent brake port as a locomotive brake signal;

an electropneumatic brake signal module removably mounted on said manifold and providing a pneumatic train brake signal;

a brake cylinder module removably mounted on said manifold and controlling pressure at said brake cylinder port in response to said train and locomotive brake signals;

a controller controlling said electropneumatic modules;

each of said electropneumatic modules including a) a common block having passages and a first interface with said manifold, and having supply and exhaust valves mounted to said common block and b) an auxiliary block mounted to said common block at a second interface, and having module specific pneumatic and electrical elements mounted on said auxiliary block; and each module is removable as a unit from said manifold.

35. A control unit according to claim 34, wherein each of said auxiliary blocks includes at least one electric pressure transducer and one pressure test port.

36. A modular locomotive brake control unit comprising:

a manifold having brake pipe, brake cylinder, equalization reservoir, supply and independent brake ports;

an electropneumatic equalization reservoir module removably mounted on said manifold and controlling pressure at said equalization reservoir port;

a brake pipe module removably mounted on said manifold and controlling pressure at said brake pipe port in response to equalization reservoir port pressure;

an electropneumatic independent brake module removably mounted on said manifold and controlling pressure at said independent brake port as a locomotive brake signal;

an electropneumatic brake signal module removably mounted on said manifold and providing a pneumatic train brake signal;

a brake cylinder module removably mounted on said manifold and controlling pressure at said brake cylinder port in response to said train and locomotive brake signals;

a controller controlling said electropneumatic modules;

each of said electropneumatic modules including electropneumatic and pneumatic elements;

said brake pipe module including electrical brake pipe pressure transducer and electrical brake pipe flow transducer connected to said controller; and each module is removable as a unit from said manifold.

37. A control unit according to claim 36, wherein said brake pipe module includes electrical supply pressure transducer connected to said controller.

38. A modular locomotive brake control unit comprising:

a manifold having brake pipe, brake cylinder, equalization reservoir, supply and independent brake ports;

an electropneumatic equalization reservoir module removably mounted on said manifold and controlling pressure at said equalization reservoir port;

a brake pipe module removably mounted on said manifold and controlling pressure at said brake pipe port in response to equalization reservoir port pressure;

an electropneumatic independent brake module removably mounted on said manifold and controlling pressure at said independent brake port as a locomotive brake signal;

an electropneumatic brake signal module removably mounted on said manifold and providing a pneumatic train brake signal;

a brake cylinder module removably mounted on said manifold and controlling pressure at said brake cylinder port in response to said train and locomotive brake signals;

a controller controlling said electropneumatic modules;

each of said electropneumatic modules including electropneumatic and pneumatic elements;

a brake cylinder pressure test port and a brake cylinder electrical pressure transducer on one of said electropneumatic modules; and each module is removable as a unit from said manifold.

39. A modular locomotive brake control unit comprising:

a manifold having brake pipe, brake cylinder, equalization reservoir, supply and independent brake ports;

an electropneumatic equalization reservoir module removably mounted on said manifold and controlling pressure at said equalization reservoir port;

a brake pipe module removably mounted on said manifold and controlling pressure at said brake pipe port in response to equalization reservoir port pressure;

an electropneumatic independent brake module removably mounted on said manifold and controlling pressure at said independent brake port as a locomotive brake signal;

an electropneumatic brake signal module removably mounted on said manifold and providing a pneumatic train brake signal;

a brake cylinder module removably mounted on said manifold and controlling pressure at said brake cylinder port in response to said train and locomotive brake signals;

at least each of said electropneumatic modules including an identifier;

a controller controlling said electropneumatic modules and storing the identifier of each of said electropneumatic modules mounted on said manifold;

each of said electropneumatic modules including electropneumatic and pneumatic elements; and each module is removable as a unit from said manifold.

* * * * *